US012559126B2

(12) United States Patent
Yahata

(10) Patent No.: US 12,559,126 B2
(45) Date of Patent: Feb. 24, 2026

(54) INFORMATION PRESENTATION METHOD, INFORMATION PRESENTATION DEVICE, AND RECORDING MEDIUM

(71) Applicant: Panasonic Automotive Systems Co., Ltd., Kanagawa (JP)

(72) Inventor: Hiroshi Yahata, Osaka Fu (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 14 days.

(21) Appl. No.: 18/824,340

(22) Filed: Sep. 4, 2024

(65) Prior Publication Data

US 2025/0108823 A1 Apr. 3, 2025

(30) Foreign Application Priority Data

Sep. 29, 2023 (JP) ................................. 2023-170108

(51) Int. Cl.
*B60W 50/14* (2020.01)
*B60K 35/28* (2024.01)
(52) U.S. Cl.
CPC ............. *B60W 50/14* (2013.01); *B60K 35/28* (2024.01); *B60K 2360/166* (2024.01); *B60K 2360/1868* (2024.01); *B60W 2050/146* (2013.01); *B60W 2420/403* (2013.01); *B60W 2420/408* (2024.01); *B60W 2420/50* (2013.01); *B60W 2556/40* (2020.02); *B60W 2556/45* (2020.02)
(58) Field of Classification Search
CPC ............. B60W 50/14; B60W 2556/40; B60W 2556/45; B60W 2420/408; B60W 2050/146; B60W 2420/403; B60W 2420/50; B60K 35/28; B60K 2360/1868; B60K 2360/166
See application file for complete search history.

(56) References Cited

U.S. PATENT DOCUMENTS

| | | | | |
|---|---|---|---|---|
| 6,636,805 | B1 | 10/2003 | Tada et al. | |
| 2020/0311672 | A1* | 10/2020 | Son | G06Q 10/1097 |
| 2020/0327495 | A1* | 10/2020 | Son | G06Q 10/0832 |
| 2024/0273459 | A1* | 8/2024 | Urata | G16Y 10/40 |

FOREIGN PATENT DOCUMENTS

| | | | |
|---|---|---|---|
| CN | 104240052 | A * | 12/2014 |
| JP | 2001-208562 | | 8/2001 |

* cited by examiner

*Primary Examiner* — Chico A Foxx
(74) *Attorney, Agent, or Firm* — Greenblum & Bernstein, P.L.C.

(57) ABSTRACT

An information presentation method is for presenting information to a user in a vehicle interior of a vehicle for transporting a cargo. The method includes displaying first guidance information indicating, on a road map, at least part of a first route from a current position of the vehicle to a destination of the vehicle. The first guidance information is displayed on a display provided in the vehicle interior. The method includes switching the first guidance information displayed on the display to second guidance information when the vehicle reaches a predetermined range from the destination. The second guidance information indicates, on a premises map of the destination, at least part of a second route to a stop position at which the vehicle is required to stop for handling the cargo on premises of the destination.

14 Claims, 10 Drawing Sheets

| COORDINATE | TASK | TIME | TIME DIFFERENCE |
|---|---|---|---|
| Y1 | START OF MOVEMENT | 10:48:45 | - |
| Y2 | PASSAGE | 10:49:30 | - |
| Y3 | ARRIVAL | 10:50:00 | - |
| Y3 | ROTATION (SOUTH) | 10:50:30 | - |
| Y3 | LOADING (C) | 10:51:00 | - |
| Y4 | PASSAGE | 10:52:50 | - |
| Y5 | PASSAGE | 10:53:30 | +20 |
| Y6 | ARRIVAL | 10:54:00 | +50 |
| Y6 | LOADING (C) | 10:54:30 | +1:20 |
| : | : | : | |

FIG.10

| COORDI-NATE | TASK | TIME | TIME DIFFER-ENCE |
|---|---|---|---|
| Y4 | PASSAGE | 10:52:50 | -20 |
| Y5 | PASSAGE | 10:53:30 | +20 |
| Y6 | ARRIVAL | 10:54:00 | +50 |
| Y6 | UNLOADING (C) | 10:54:30 | +1:20 |
| ·· | ·· | ·· | |

INFORMATION PRESENTATION METHOD, INFORMATION PRESENTATION DEVICE, AND RECORDING MEDIUM

CROSS-REFERENCE TO RELATED APPLICATIONS

This application is based upon and claims the benefit of priority from Japanese Patent Application No. 2023-170108, filed on Sep. 29, 2023, the entire contents of which are incorporated herein by reference.

FIELD

The present disclosure relates generally to an information presentation method, an information presentation device, and a recording medium.

BACKGROUND

Conventionally, there has been known a navigation system that guides a vehicle traveling on a general road (a public road) along a travel path (route) from a current location to a destination on the basis of map information about a traffic infrastructure constructed in a real space (a physical space) such as a road.

In such a navigation system, an appropriate route guidance mode varies with the travel environment of the vehicle, and thus, there has been a demand for a technology that varies the route guidance mode according to the travel area.

In one example, a patent literature JP 2001-208562 A discloses a technology for generating route guidance data to be transmitted to an in-vehicle navigation device with different guidance levels between map areas specified by guidance area information and the other map areas for the purpose of reducing the amount of route guidance data to be transmitted and reducing communication costs.

In the conventional navigation system, there is a demand for presentation of information that is suitable for the purpose of use when a user uses a vehicle.

SUMMARY

An information presentation method according to one aspect of the present disclosure is a method of presenting information to a user in a vehicle interior of a vehicle for transporting a cargo. The information presentation method includes displaying first guidance information indicating, on a road map, at least part of a first route from a current position of the vehicle to a destination of the vehicle. The displaying is performed on a display provided in the vehicle interior. The information presentation method includes switching the first guidance information displayed on the display to second guidance information when the vehicle reaches a predetermined range from the destination. The second guidance information indicates, on a premises map of the destination, at least part of a second route to a stop position at which the vehicle is required to stop for handling the cargo on premises of the destination.

BRIEF DESCRIPTION OF THE DRAWINGS

FIG. 8 is a diagram for describing construction of a traffic infrastructure in a cyberspace (a virtual space) regarding a specific area according to the embodiment;

FIG. 10 is a diagram illustrating an example of an aspect in which information regarding a specific area is presented according to an embodiment.

DETAILED DESCRIPTION

Figure 1:
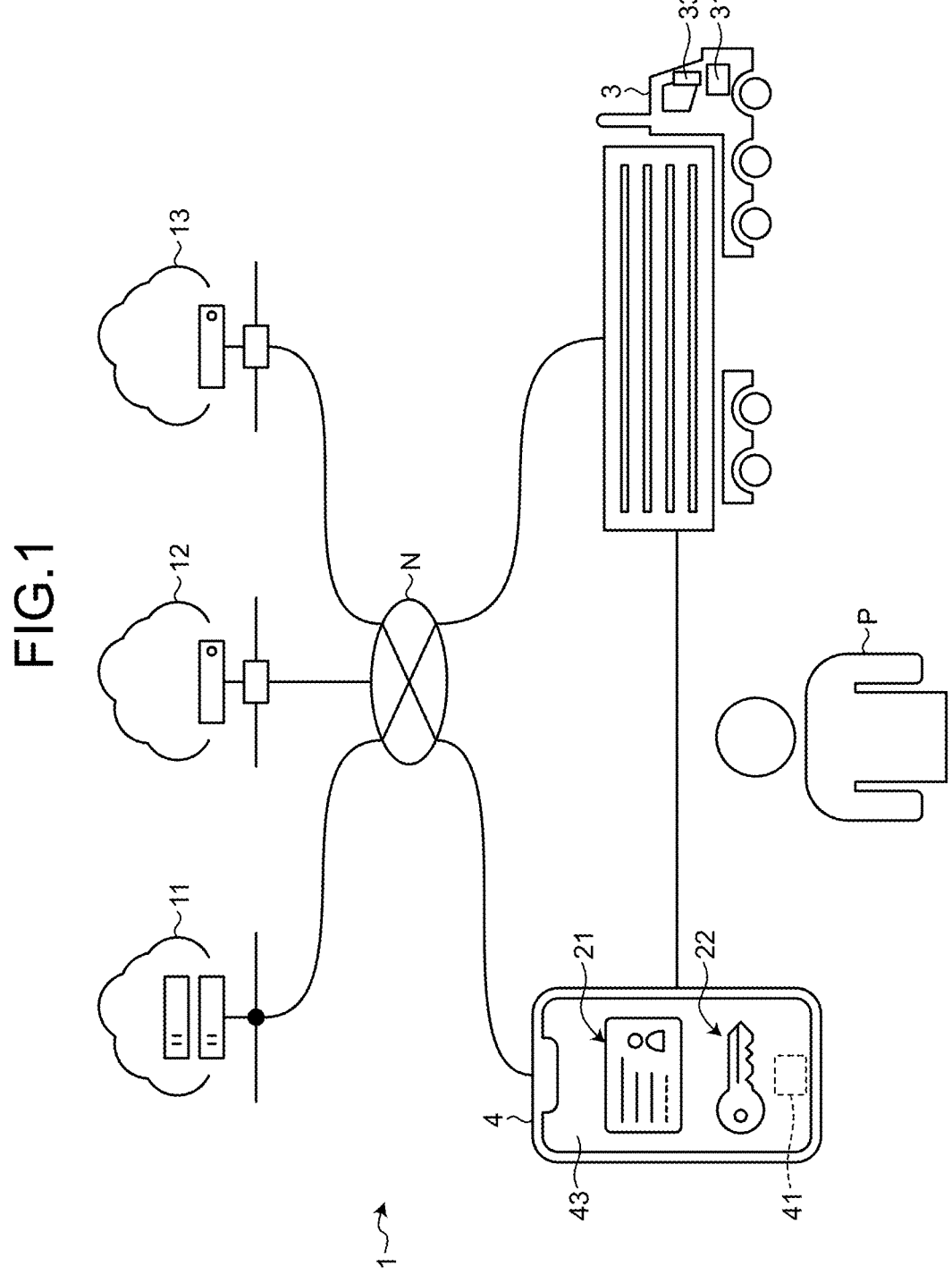
FIG. 1 is a diagram illustrating an example of a configuration of an information presentation system according to an embodiment.

Hereinafter, an information presentation method, an information presentation device, a vehicle, an information presentation system, and a recording medium according to embodiments of the present disclosure will be described with reference to the drawings.

In the description of the present disclosure, components having the same or substantially the same functions as those described above with reference to the previously mentioned drawings are denoted by the same reference numerals, and the description thereof may be omitted accordingly. In addition, even when the same or substantially the same parts are illustrated, the dimensions and ratios may be differently illustrated between the drawings.

Moreover, from the viewpoint of ensuring the visibility of the drawings, in the description of each drawing, only main components are denoted by reference numerals, and even components having the same or substantially the same functions as those described above with reference to the previously mentioned drawings may not be denoted by reference numerals.

In the description of the present disclosure, components having the same or substantially the same function may be described in a distinguished manner by adding alphanumeric characters to the end of the reference numeral. Alternatively, in a case where components having the same or substantially the same function are not distinguished from each other, the components may be described in a collective manner by omitting the alphanumeric characters added to the end of the reference numeral.

Hereinafter, information presentation according to the present disclosure will be described with an example in which the present disclosure is applied to logistics in which a cargo is transported by a vehicle with a logistics base (a specific area) as at least one of a departure place, a relay spot, and a destination.

FIG. 1 is a diagram illustrating an example of a configuration of an information presentation system 1 according to an embodiment. The information presentation system 1 includes a logistics data center 11, a vehicle management cloud 12, a logistics base cloud 13, a vehicle 3, and a mobile terminal 4.

As illustrated in FIG. 1, each of the vehicle 3 and the mobile terminal 4 is communicably connected to each of the logistics data center 11, the vehicle management cloud 12, and the logistics base cloud 13 via a network N. The network N is a telecommunications line (a wide area communication network) such as the Internet. In addition, the vehicle 3 and the mobile terminal 4 are connected to each other so as to be able to communicate with each other through communication (short-range communication) conforming to any wireless communication standard. The vehicle 3 and the mobile terminal 4 may be communicably connected to each other via the network N. In addition, a computer system (not illustrated) provided in a logistics base (a departure place, a relay spot, or a destination) where cargo handling such as loading the cargo onto the vehicle 3 or unloading the cargo from the vehicle 3 is performed can also be connected to the network N.

The logistics data center 11 is, for example, a computer system storing a database that manages logistics data for a manufacturing base, a logistics base, a sales base, and the like in a predetermined format. The logistics data center 11 according to the embodiment may be configured by one data center (server) in a centralized configuration, or may be configured by a plurality of computers (nodes) constituting a distributed network.

The vehicle management cloud 12 is a computer system of which a user is at least one transportation company using a logistics base. The vehicle management cloud 12 is configured to execute at least one type of software for managing the vehicle 3 owned or managed by the transportation company or a driver P employed or commissioned by the transportation company. In one example, the vehicle management cloud 12 manages a vehicle ID, a current position, operation schedule information (loading/unloading information and route information), driver information (driver ID), and the like for the vehicle 3 in association with each other. The vehicle management cloud 12 according to the embodiment is an example of a server.

The logistics base cloud 13 is a computer system of which a user is a business operator who manages a logistics base. The logistics base cloud 13 is configured to execute at least one type of software for acquiring, in real time, information about a plurality of cargos, a plurality of vehicles 3, and a plurality of drivers P from the logistics data center 11 to optimize the overall logistics base operation. In one example, the logistics base cloud 13 controls and manages trucks (vehicles 3), forklifts, and the like at the logistics base to maximize the throughput (the relay processing capacity) with respect to cargos passing through the logistics base while maintaining safety. The logistics base cloud 13 according to the embodiment is an example of a server.

The vehicle 3 is a vehicle such as a truck owned or managed by a user of the vehicle management cloud 12, and is driven by a driver P who is employed or commissioned by the user of the vehicle management cloud 12. The vehicle 3 includes a control unit 31. In the vehicle 3, a human machine interface (HMI) 33 is installed as an input/output I/F of the control unit 31. The control unit 31 is configured to execute information processing on the vehicle 3 side according to the embodiment. In one example, the control unit 31 controls communication with the outside of the vehicle 3, display performed by the HMI 33, traveling of the vehicle 3, and the like. The control of the traveling of the vehicle 3 may be control of autonomous driving (automatic driving), control according to an operation of the driver P, or control for supporting a driving operation of the driver P.

The control unit 31 of the vehicle 3 is configured to detect a traffic object existing in a physical space via at least one (a first sensor) of a camera, a positioning sensor, and a LiDAR disposed in the vehicle 3 off the premises of the destination (meaning outside the site of the facility, which is a destination, the same applies below) and control the traveling of the vehicle 3 on the basis of a result of the detection.

The control unit 31 of the vehicle 3 is configured to control the traveling of the vehicle 3 on the basis of at least one of a result of detecting a traffic object existing in a physical space via at least one of the first sensor and a second sensor different from the first sensor and a result of specifying a virtual traffic object existing in a cyberspace acquired from the logistics base cloud 13, when the driving mode is switched to automatic driving in accordance with an operation of the driver P on the premises of the destination (meaning inside the site of the facility, which is a destination, and the same applies below) or on the public road. The second sensor is at least one of a radar, a magnetic sensor, and a wireless communication circuit (a communication I/F 54) disposed in the vehicle 3. In addition, the wireless communication circuit is a short-range wireless communication circuit using any communication system such as Wi-Fi (registered trademark), Bluetooth (registered trademark), Low Energy (BLE), or Ultra-Wide Band (UWB).

The mobile terminal 4 is a portable information terminal device such as a smartphone used by the driver P of the vehicle 3. The mobile terminal 4 includes a control unit 41. In addition, a human machine interface (HMI) 43 is installed in the mobile terminal 4 as an input/output I/F of the control unit 41. The control unit 41 of the mobile terminal 4 is configured to execute at least one application program (application) for managing a digital license 21 of the driver P, a driver ID based on information written in the digital license 21, and an electronic key 22. The mobile terminal 4 carried by the driver P in the cabin of the vehicle 3 or attached to the vehicle 3 is an example of an information presentation device that presents information to the user in the cabin of the vehicle 3.

In the information presentation system 1, the vehicle 3 driven by the driver P and the mobile terminal 4 used by the driver P can collaborate with each other by using, for example, the electronic key 22 managed in the mobile terminal 4. The vehicle ID of the vehicle 3 and the driver ID based on the digital license 21 of the driver P are associated with each other by the control unit 31 of the vehicle 3 or the control unit 41 of the mobile terminal 4. A result of the association is notified by the vehicle 3 or the mobile terminal 4 to the vehicle management cloud 12 for management, and can also be used for managing the attendance and working hours of the driver P or the like.

Note that a time during which the vehicle 3 is traveling is recorded and managed by the vehicle management cloud 12 as a working time or a restraint time of the driver P associated with the vehicle ID of the vehicle 3. In addition, the vehicle management cloud 12 may determine that the vehicle 3 is in a parking state when the shift state of the vehicle 3 is parking or when the vehicle 3 stays at the same place for a predetermined time or more, and may automatically record the time for which the vehicle 3 has been in the parking state as a restraint time, a break time, or the like, not included in the working time of the associated driver P. In addition, when the driver P attempts to drive the vehicle 3 in a state where it is determined that the driver P has not taken a predetermined break time, a warning indicating that the driver P has not taken enough rest may be issued by the HMI 33 of the vehicle 3, the HMI 43 of the mobile terminal 4 of the driver P, and the vehicle management cloud 12.

Note that, in the information presentation system 1 according to the present disclosure, some of the processing of the control unit 31 (the information presentation device) of the vehicle 3 may be executed by a device outside the control unit 31. Part of or all the information processing related to the information presentation (the information presentation processing) of the control unit 31 of the vehicle 3 according to the embodiment may be executed by the control unit 41 of the mobile terminal 4. The control unit 31 of the vehicle 3 and the control unit 41 of the mobile terminal 4 related to the information presentation processing according to the embodiment may be configured as an integrated unit. Part of the information presentation processing of the control unit 31 of the vehicle 3 may be executed by at least one of the logistics data center 11, the vehicle management cloud 12, and the logistics base cloud 13. In addition, at least two of the logistics data center 11, the vehicle management cloud 12, and the logistics base cloud 13 may be configured as an integrated unit.

The information processing (the information presentation processing) according to the embodiment may be implemented by collaboration between at least one of the logistics data center 11, the vehicle management cloud 12, and the logistics base cloud 13 and at least one of the control unit 31 of the vehicle 3 and the control unit 41 of the mobile terminal 4, and the division of the processing can be appropriately changed.

In one example, the information presentation processing according to the embodiment may be implemented by generating and displaying display information in at least one of the HMI 33 of the vehicle 3 and the HMI 43 of the mobile terminal 4 on the basis of information acquired from at least one of the logistics data center 11, the vehicle management cloud 12, and the logistics base cloud 13.

In one example, the information presentation processing according to the embodiment may be implemented by displaying display information generated by at least one of the logistics data center 11, the vehicle management cloud 12, and the logistics base cloud 13 on at least one of the HMI 33 of the vehicle 3 and the HMI 43 of the mobile terminal 4.

Figure 2:
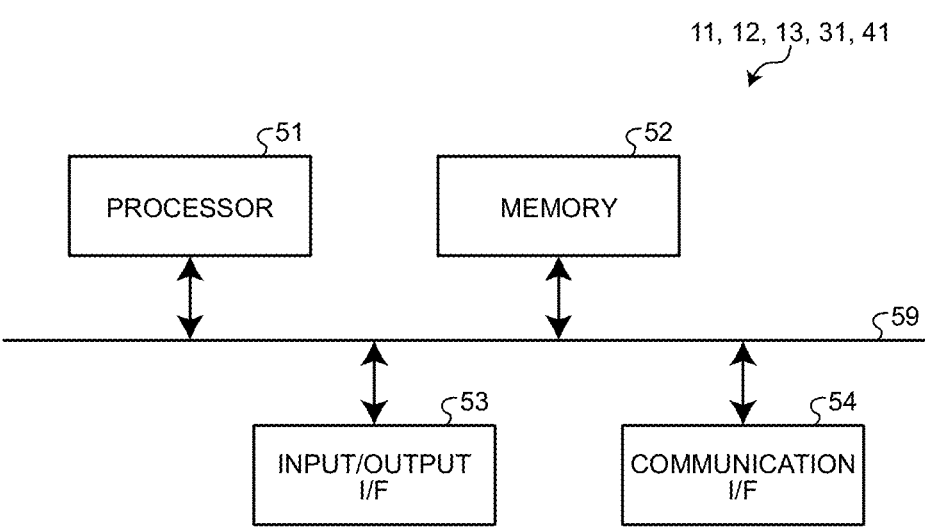
FIG. 2 is a block diagram illustrating an example of a hardware configuration of each device of an information presentation system according to an embodiment.

FIG. 2 is a block diagram illustrating an example of a hardware configuration of each of the devices (the logistics data center 11, the vehicle management cloud 12, the logistics base cloud 13, the control unit 31 of the vehicle 3, and the control unit 41 of the mobile terminal 4) of the information presentation system 1 according to the embodiment.

As illustrated in FIG. 2, each of the devices of the information presentation system 1 includes a processor 51, a memory 52, an input/output interface (I/F) 53, and a communication I/F 54. The processor 51, the memory 52, the input/output I/F 53, and the communication I/F 54 are connected to each other by a bus 59 or the like, constituting a hardware configuration using a standard computer.

The logistics data center 11, the vehicle management cloud 12, and the logistics base cloud 13 are each implemented by a computer system including at least one computer. The computer system may be configured by one data center (computer) in a centralized configuration, or may be configured by a plurality of computers (nodes) capable of communicating with each other on a network in a distributed manner. The control unit 31 of the vehicle 3 is an example of an information presentation device that can be provided in the vehicle 3. The control unit 31 is implemented by, for example, at least one electronic control unit (ECU) or an on board unit (OBU) provided inside the vehicle 3. Note that the control unit 31 may be implemented by a domain control unit (DCU) such as a cockpit domain controller (CDC) in which some ECUs are integrated. The CDC is configured to execute controlling in-vehicle infotainment (IVI) systems or meters, controlling a display device such as a head up display (HUD) or an electronic mirror, and processing by an advanced driver-assistance system (ADAS) or the like. Moreover, the control unit 31 may also serve as a car navigation device or the like. Alternatively, the control unit 31 may be an external computer installed near a dashboard of the vehicle 3. Note that the control unit 31 may be configured to be integrated with the HMI 33 or to collaborate with the HMI 33 through communication, and may be implemented as an information presentation device that can be provided in the vehicle 3.

In one example, the control unit 41 of the mobile terminal 4 is a computer provided in a portable terminal device such as a smartphone.

The processor 51 is an arithmetic device that controls each of the devices of the information presentation system 1 as a whole. The processor 51 implements processing to be described below in each of the devices of the information presentation system 1, by loading a program stored in a read only memory (ROM), a hard disk drive (HDD), or the like of the memory 52 into a random access memory (RAM) of the memory 52 and executing the program.

Note that, as the processor 51, various processors such as a central processing unit (CPU), a graphics processing unit (GPU), and a digital signal processor (DSP), dedicated arithmetic circuits implemented by an application specific integrated circuit (ASIC) and a field programmable gate array (FPGA), and the like can be used as appropriate.

In each of the devices of the information presentation system 1, the memory 52 includes, for example, a ROM that stores programs, parameters, and the like for the processor 51 to implementing various kinds of processing. The memory 52 includes, for example, a RAM as a main storage device that temporarily stores data necessary for the processor 51 to perform various kinds of processing. Note that the memory 52 may include various storage media and storage devices such as an HDD, a solid state drive (SSD), and a flash memory that store various kinds of data and programs used in each of the devices of the information presentation system 1.

The input/output I/F 53 may be an output device that presents various types of information to the user in each of the devices of the information presentation system 1. The input/output I/F 53 may be an input device that receives an operation input by the user in each of the devices of the information presentation system 1. Note that the input/output I/F 53 may be a connection interface for connecting an external device in each of the devices of the information presentation system 1. The HMI 33 of the vehicle 3 and the HMI 43 of the mobile terminal 4 (see FIG. 1) are each an example of the input/output I/F 53 of the vehicle 3 and the mobile terminal 4.

In one example, the input/output I/F 53 may include a display configured to output images as an output device. The display is, for example, a liquid crystal display (LCD) or an organic electro luminescence (EL) display. Note that the display may be configured as a touch panel display. The input/output I/F 53 may include a speaker or the like configured to output a notification sound, a warning sound, or a voice as an output device.

Note that the display of the input/output I/F 53 may be a projection-type display device such as an HUD that projects an image (a virtual image) on a display area or the like provided in front of the user (for example, on a windshield or a dashboard (console) in the vehicle 3).

The output device of the input/output I/F 53 may be a display device that displays presentation information in a superimposed manner within a user's field of view using an extended reality (XR) technology such as augmented reality (AR) glasses worn by the user, for example. This display device is not limited to a glasses-type head mounted display (HMD) such as AR glasses, and a contact lens-type wearable device may be used. The display device is not limited to the AR technology, and various XR technologies such as virtual reality (VR), mixed reality (MR), and substitutional reality (SR) can be used.

The output device of the input/output I/F 53 may be a display device that projects an image onto the retina. This display device includes, for example, a projection unit that emits laser light for representing an image, and an optical system including a mirror that forms an image of the laser light from the projection unit onto the retina. Alternatively, this display device includes, for example, an optical system including a half mirror and a projection unit that projects an image onto the half mirror.

In one example, the input/output I/F 53 may include a touch panel of a touch panel display as an input device, or may include a tactile display that transmits information to the user by tactile sense. Note that the input/output I/F 53 may include a button, a dial, a switch, a microphone, or the like as an input device.

As the input/output I/F 53, for example, an operation terminal capable of transmitting and/or receiving signals between each device and the outside of each device, such as a tablet terminal, a smartphone, a remote controller, or an electronic key, may be used.

The communication I/F 54 is a wired or wireless communication circuit for transmitting and receiving data to and from the outside of each of the devices in each of the devices of information presentation system 1. As the wireless communication circuit, for example, a communication circuit using any cellular V2X system such as a mobile communication system of each generation such as 3G, LTE, 4G, or 5G compliant with regulations of IMT2020 or specifications of 3GPP (registered trademark), or a mobile communication system of a next generation such as Beyond 5G (6G) can be appropriately used.

Note that the wireless communication circuit of the vehicle 3 may be, for example, a communication circuit using another communication system such as a DSRC system conforming to the IEEE standard or a vehicle-to-vehicle or road-to-vehicle communication (vehicle-to-cellular-network (V2N)) system.

As a wireless communication circuit between the vehicle 3 and the mobile terminal 4, short-range wireless communication using any communication system such as Wi-Fi (registered trademark), Bluetooth (registered trademark), Low Energy (BLE), or Ultra-Wide Band (UWB) can be appropriately used. Note that the communication circuit for short-range wireless communication provided in the vehicle 3 may be used as a sensor (a second sensor) that detects a current position of the vehicle 3 on the basis of information on a position of an access spot or a terminal device with which communication is performed. The short-range wireless communication may be performed using an electronic toll collection (ETC) system.

Note that the communication I/F 54 of the control unit 31 of the vehicle 3 may receive data from another device provided in the vehicle 3, e.g., an in-vehicle sensor, or transmit and receive information to and from another ECU provided in the vehicle 3 via an in-vehicle network of the vehicle 3. The in-vehicle network of the vehicle 3 includes, for example, a controller area network (CAN), Ethernet (registered trademark), a universal serial bus (USB) (registered trademark), and the like.

In one example, the in-vehicle sensor of the vehicle 3 includes a global navigation satellite system (GNSS) sensor (positioning sensor) that outputs information on a position of the vehicle 3, such as a global positioning system (GPS) sensor. Note that the GNSS sensor includes a GNSS antenna that receives radio waves from satellites, and a GNSS circuit that obtains position information based on radio waves from at least two satellites received by the GNSS antenna.

In one example, the in-vehicle sensor of the vehicle 3 includes a sonar (sound navigation and ranging) that detects an object around the vehicle 3 on the basis of a sound wave transmission/reception result. In one example, the in-vehicle sensor of the vehicle 3 includes a radar (radio detection and ranging) that detects an object around the vehicle 3 on the basis of a radio wave transmission/reception result. In one example, the in-vehicle sensor of the vehicle 3 includes a LiDAR (light detection and ranging) that detects an object around the vehicle 3 on the basis of a laser light transmission/reception result. In one example, the in-vehicle sensor of the vehicle 3 includes a camera that captures images (an image and/or a moving image) around the vehicle 3 on the basis of visible light and/or infrared light. In one example, the in-vehicle sensor of the vehicle 3 includes a magnetic sensor that detects a magnetic marker disposed along a traveling path.

At least one of the camera, the positioning sensor, and the LiDAR according to the embodiment is an example of a first sensor disposed in the vehicle 3. In addition, at least one of the radar, the magnetic sensor, and the short-range wireless communication circuit (the communication I/F 54) according to the embodiment is an example of a second sensor disposed in the vehicle 3. As will be described in detail below, the vehicle 3 and/or the mobile terminal 4 is configured to detect a current position of the vehicle 3 via the first sensor in an off-premises mode. On the other hand, the vehicle 3 and/or the mobile terminal 4 is configured to detect a current position of the vehicle 3 via at least one of the first sensor and the second sensor in an on-premises mode.

In one example, the in-vehicle sensor of the vehicle 3 includes a steering angle sensor that outputs a signal corresponding to an amount in which a steering wheel is operated by the driver P, namely, a steering angle. In one example, the in-vehicle sensor of the vehicle 3 includes a wheel speed sensor that outputs a signal corresponding to a rotation speed and a rotation direction of wheels of the vehicle 3. In one example, the in-vehicle sensor of the vehicle 3 includes a brake sensor that detects an amount in which a brake pedal is operated by the driver P. In one example, the in-vehicle sensor of the vehicle 3 includes an accelerator sensor that detects an amount in which an accelerator pedal is operated by the driver P. In one example, the in-vehicle sensor of the vehicle 3 includes an acceleration sensor that outputs a signal corresponding to acceleration applied to the vehicle 3. In one example, the in-vehicle sensor of the vehicle 3 includes a gyro sensor that outputs a signal corresponding to an angular velocity applied to the vehicle 3. Each of the acceleration sensor and the gyro sensor may be provided, for example, in three axes, and configured as an inertial measurement unit (IMU).

Next, the information processing executed by the information presentation system 1 configured as described above will be described.

Figure 3:
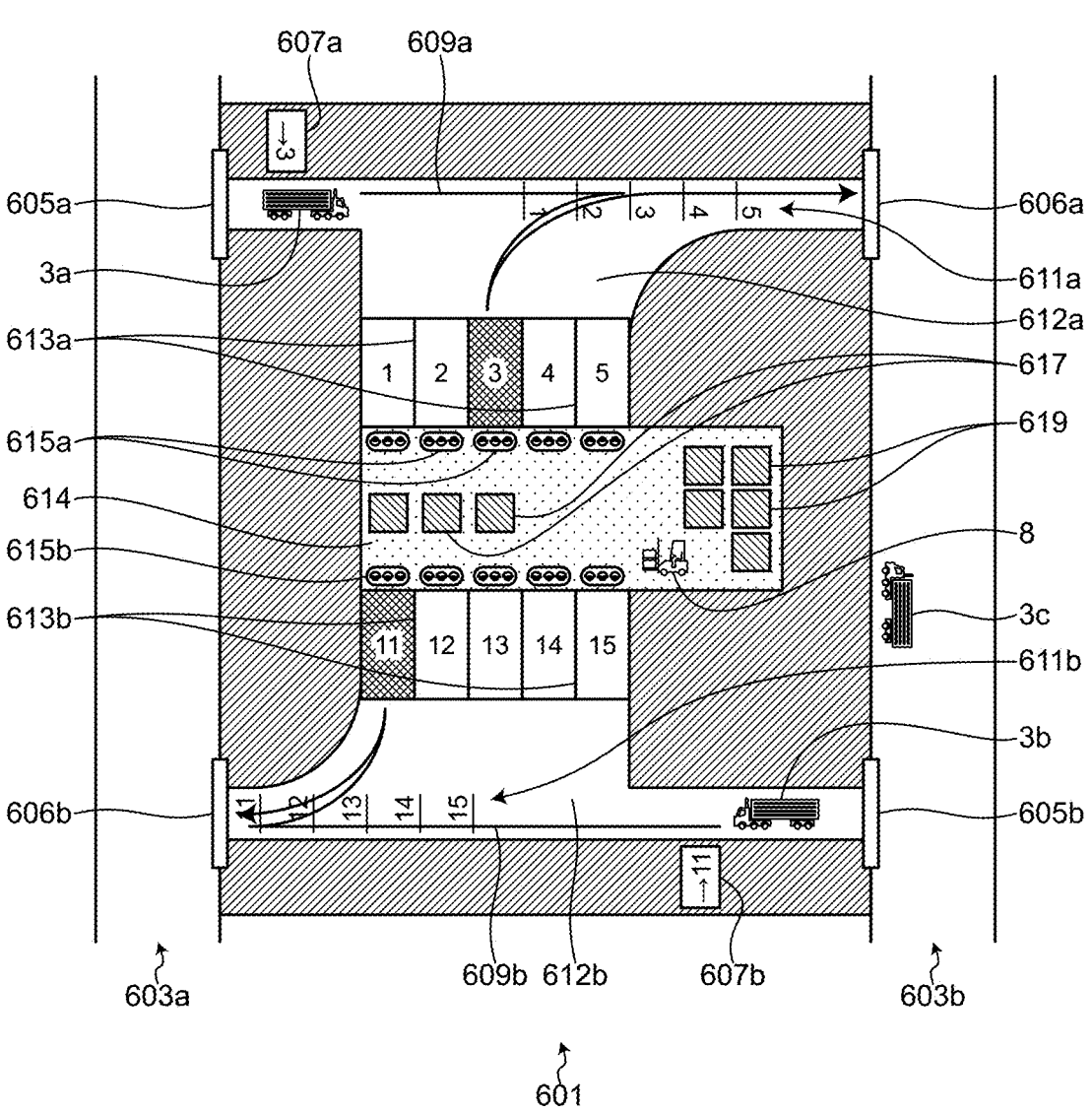
FIG. 3 is a diagram for describing a specific area according to an embodiment.

FIG. 3 is a diagram for describing a specific area according to the embodiment. FIG. 3 illustrates a logistics base 601, which is at least one of a departure place, a relay spot, and a destination of the vehicle 3 in a case where the technology related to information presentation according to the embodiment is applied to logistics. The logistics base 601 is an example of a specific area having a different traffic infrastructure from a public road 603. FIG. 3 illustrates public roads 603a and 603b as the public road 603. In addition, FIG. 3 illustrates vehicles 3a, 3b, and 3c as the vehicle 3 using the logistics base 601.

The logistics base 601 has an entrance 605 and an exit 606 for connection to the public road 603. At the entrance 605, a camera that reads a vehicle number of the vehicle 3 that has entered the premises is provided in the logistics base 601. The entrance 605 may acquire the vehicle number of the vehicle 3 that has entered the premises by communicating with the vehicle 3. FIG. 3 illustrates entrances 605a and 605b as the entrance 605. FIG. 3 illustrates exits 606a and 606b as the exit 606.

In the logistics base 601, a traveling path 612, which is a non-public road connected to the public road 603 via the entrance 605 and the exit 606, is provided. FIG. 3 illustrates traveling paths 612a and 612b as the traveling path 612. In the example of FIG. 3, the traveling path 612a is connected to the public road 603a via the entrance 605a, and is connected to the public road 603b via the exit 606a. The traveling path 612b is connected to the public road 603b via the entrance 605b, and is connected to the public road 603a via the exit 606b.

In the logistics base 601, a plurality of berths 613 for parking the vehicle 3 to perform cargo handling such as loading and unloading on the premises is provided. FIG. 3 illustrates berths 613a and 613b as the plurality of berths 613. The berths 613a are arranged between the traveling path 612a on the premises and a cargo handling space 614. The berths 613b are arranged between the traveling path 612b on the premises and the cargo handling space 614.

In the logistics base 601, an electronic signboard 607 for displaying a number of a corresponding berth 613 when the vehicle 3 that has entered the premises from the entrance 605 passes is provided. FIG. 3 illustrates electronic signboards 607a and 607b as the electronic signboard 607. In the example of FIG. 3, the electronic signboard 607a displays an instruction to enter a berth 613 numbered "3" for the vehicle 3a having entered the logistics base 601 from the entrance 605a and traveling on the traveling path 612a. The electronic signboard 607b displays an instruction to enter a berth 613 numbered "11" for the vehicle 3b having entered the logistics base 601 from the entrance 605b and traveling on the traveling path 612b.

In the cargo handling space 614 within the logistics base 601, an electronic signboard 615 for displaying whether the vehicle 3 can enter, a vehicle number of the vehicle 3 to enter, etc. is provided at a position corresponding to each of the berths 613. FIG. 3 illustrates electronic signboards 615a and 615b as the electronic signboard 615. In the example of FIG. 3, the electronic signboard 615a performs display for the vehicle 3a that travels on the traveling path 612a and enters the berth 613 numbered "3". The electronic signboard

615b performs display for the vehicle 3b that travels on the traveling path 612b and enters the berth 613 numbered "11".

The cargo handling space 614 provided in the logistics base 601 is a space for moving a cargo 617 or 619 handled in the logistics base by a transport machine (a vehicle 8) such as a forklift or placing the cargo 617 or 619 at a predetermined position. In the example of FIG. 3, the cargo 617 is a cargo that is being handled or a cargo to be loaded onto a next vehicle 3 which is going to enter the berth. The cargo 619 is a cargo other than the cargo 617 or a cargo for which a predetermined time or more is left until its scheduled handling time.

Figure 4:
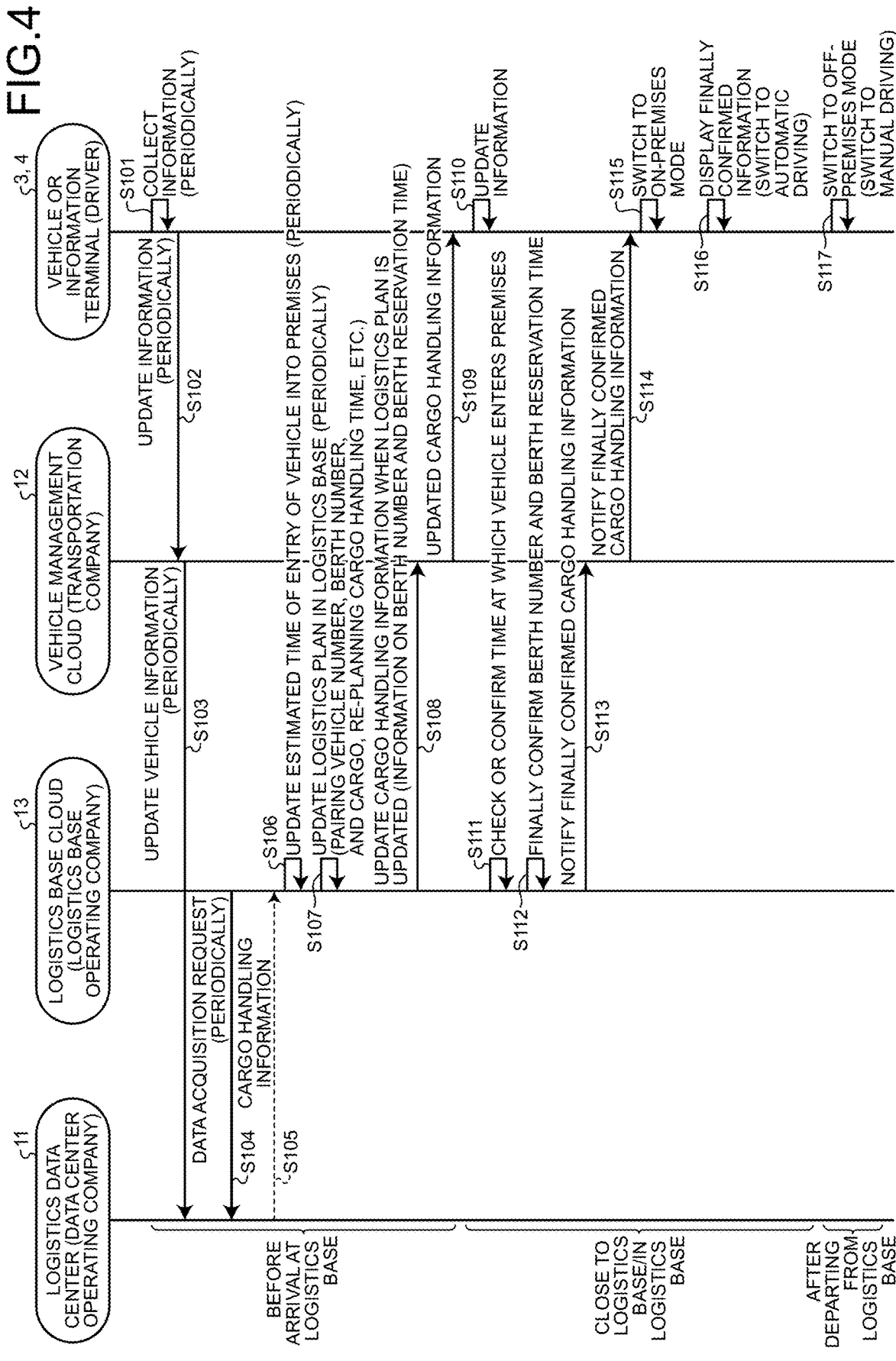
FIG. 4 is a sequence diagram illustrating an example of an information processing procedure executed by an information presentation system according to an embodiment.
Figure 5:
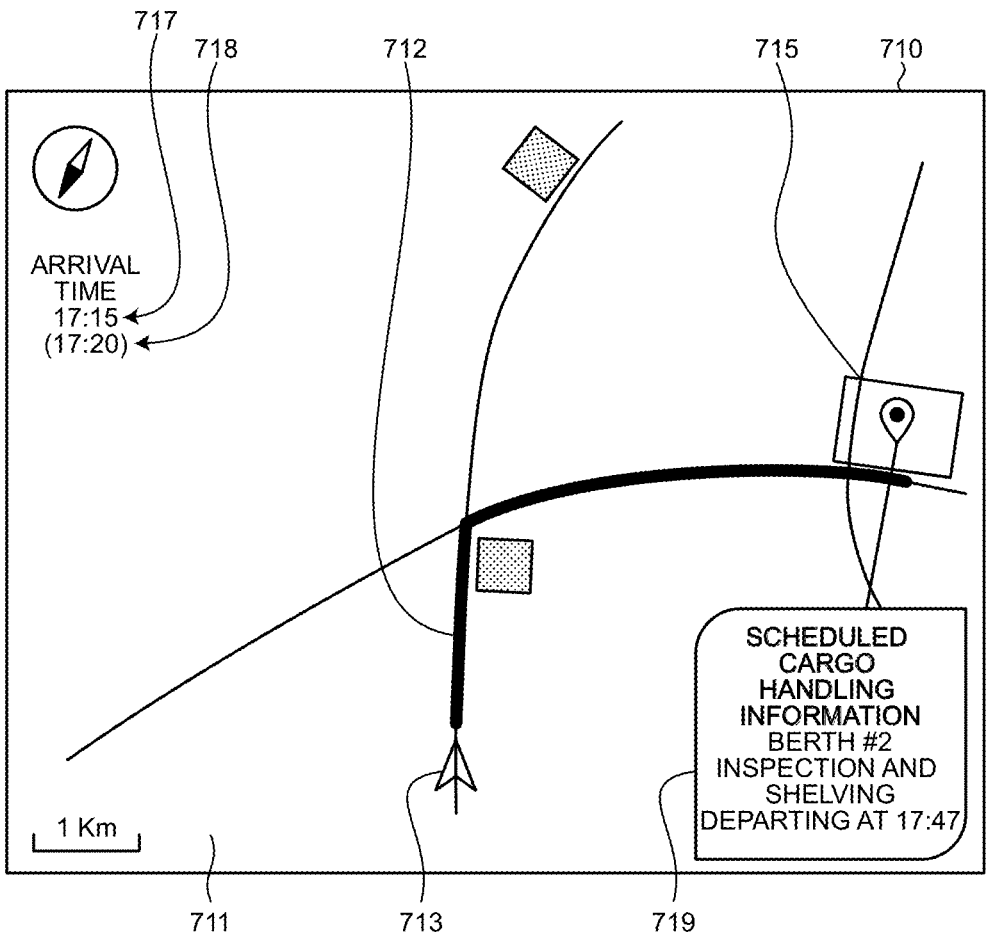
FIG. 5 is a diagram illustrating an example of an information presentation mode regarding route guidance outside a specific area in information processing according to an embodiment.
Figure 6:
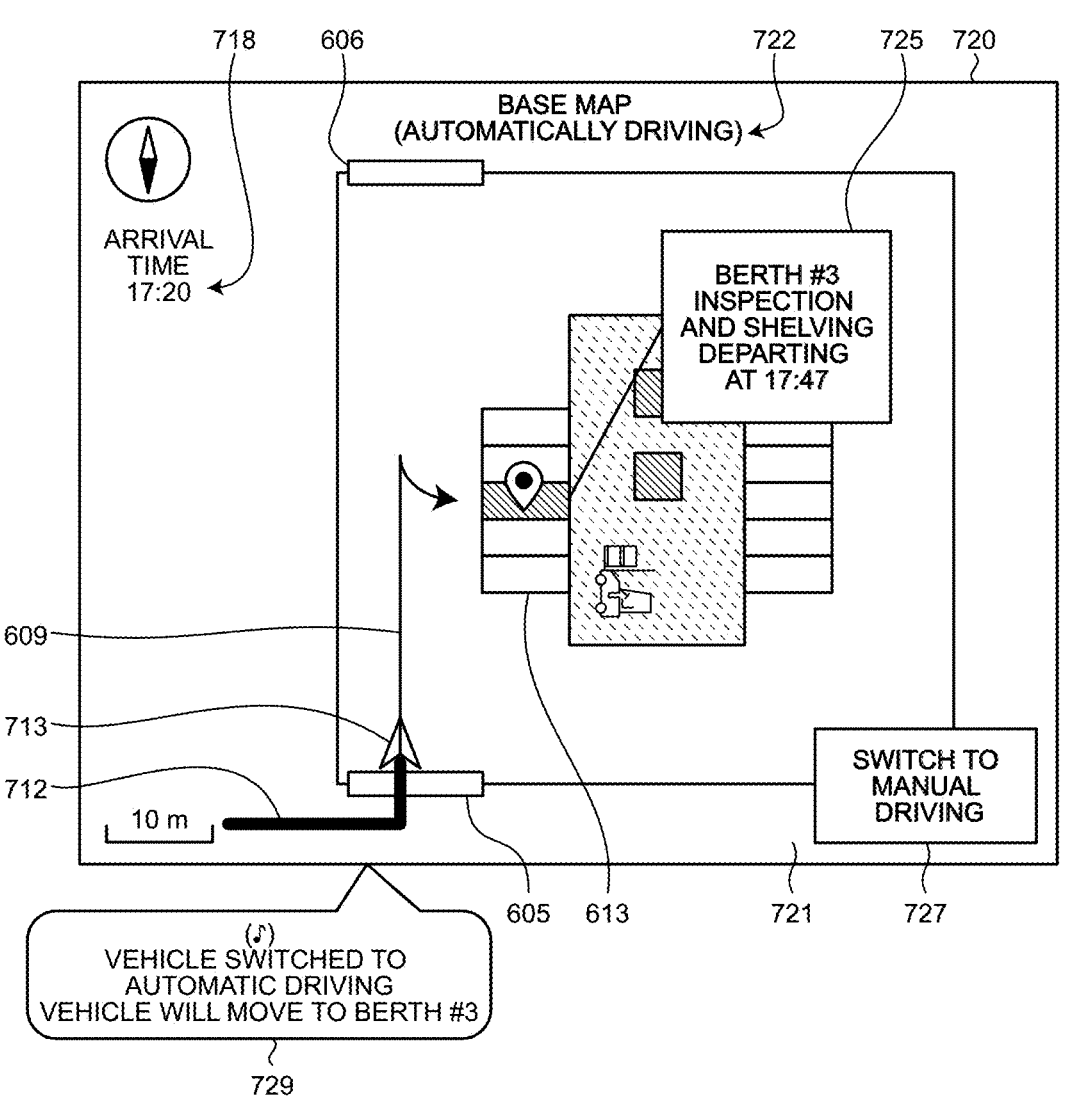
FIG. 6 is a diagram illustrating an example of an information presentation mode regarding route guidance inside a specific area in information processing according to an embodiment.

FIG. 4 is a sequence diagram illustrating an example of an information processing procedure executed by the information presentation system 1 according to the embodiment. FIG. 5 is a diagram illustrating an example of an information presentation mode regarding route guidance outside the specific area in the information processing according to the embodiment. FIG. 6 is a diagram illustrating an example of an information presentation mode regarding route guidance inside the specific area in the information processing according to the embodiment. Note that the procedure of the processing to be described below is an example, and the processing order can be changed, some of the processing can be deleted, and other processing can be added.

The procedure in FIG. 4 is started before the vehicle 3 arrives at the logistics base 601, which is a destination. At this time, the HMI 33 of the vehicle 3 or the HMI 43 of the mobile terminal 4 displays a screen display in the off-premises mode in which information regarding route guidance outside the specific area is presented. FIG. 5 illustrates a display screen 710 displayed on the HMI 33 of the vehicle 3 or the HMI 43 of the mobile terminal 4 in the off-premises mode. The display screen 710 includes an indication 711 of a road map. The road map is based on traffic objects existing in the physical space. In other words, the road map is based on map information regarding a traffic infrastructure constructed in a real space (a physical space) such as a road. In addition, the display screen 710 includes an indication 713 of a current position of the vehicle 3, an indication 715 of a destination (a logistics base 601), and an indication 712 of a first route related to a public road 603 (each first-type traveling path) from the current position to the destination. In addition, the display screen 710 includes an indication 717 of an estimated time of arrival at the logistics base 601.

In this manner, the display screen 710 in the off-premises mode presents, to the user, first guidance information indicating the first route related to the public road 603 from the current position of the vehicle 3 to the destination (the logistics base 601) on the road map.

The display screen 710 in the off-premises mode is displayed on the HMI 33 of the vehicle 3 or the HMI 43 of the mobile terminal 4, until the vehicle 3 arrives at the logistics base 601 or when the vehicle 3 is away from the logistics base 601 by a predetermined distance or more. In such a case, the destination of the first route may be any position of the logistics base 601, or may be the entrance 605 of the logistics base 601. Note that, unlike a display screen 720 (see FIG. 6) in an on-premises mode to be described below, the display screen 710 in the off-premises mode does not include a display of the second route 609 within the premises of the logistics base 601 or an indication 725 of an incidental work, but may include some of them.

First, processing (S101 to S110) while the vehicle 3 is moving to the destination, namely, before the vehicle 3 arrives at the logistics base 601 will be described.

The vehicle 3 and/or the mobile terminal 4 collects information related to the vehicle 3, for example, periodically (S101). In addition, the vehicle 3 and/or the mobile terminal 4 transmit the collected data to the vehicle management cloud 12, for example, periodically. Then, the vehicle management cloud 12 updates the vehicle information to be managed using the information from the vehicle 3 and/or the mobile terminal 4, for example, periodically (S102). This information is information included in vehicle information managed by the logistics data center 11 and the vehicle management cloud 12, and includes, for example, information such as a vehicle ID for uniquely identifying the vehicle 3, a final time and position at which a current position of the vehicle 3 is measured, and a driver ID for uniquely identifying the driver P of the vehicle 3. In addition, the vehicle management cloud 12 transmits the latest vehicle information to the logistics data center 11, for example, periodically. Then, the logistics data center 11 registers (updates) the vehicle information (which may also include driver information) received from the vehicle management cloud 12 (S103).

The vehicle information can be optionally set by a business operator, an association of business operators, or the like. The vehicle information may include various types of information such as, for example, identification information about the vehicle information, a transportation business operator ID, a vehicle ID such as a number, vehicle operation plan information (route and estimated arrival date and time), a final measurement time, a final measurement position, a vehicle type (for example, small size of 2 tons to extra-large size of 25 tons), a vehicle weight, a loading capacity weight, a loading capacity volume, a driver ID (for an automatic driving vehicle, an ID indicating automatic driving), a driver's working time (this month's attendance status), a driver's extendable working time (for determining how many hours the driver can work overtime today), a fuel/electricity efficiency (t·Km/L; t·Km/kWh), a CO2 emission coefficient (kg-CO2/L; kg-CO2/kWh), whether mixed loading is available (whether mixed loading is accepted), and a mixed loading preset condition. Note that the mixed loading preset condition includes information on a calculation formula for assisting in determination as to whether to accept mixed loading. This information may include a calculation formula itself such as $\alpha 1 \times$remaining power energy in the case of mixed loading+$\alpha 2 \times$remaining time until desired cargo arrival end date and time in the case of mixed loading+$\alpha 3 \times$remaining time of driver's extendable working time in the case of mixed loading+$\alpha 4 \times$sales increase amount (or profit increase amount, driver's income increase amount) in the case of mixed loading+$\alpha 5 \times$CO2 reduction amount in the case of mixed loading, all numerical values calculated by the calculation formula, a value of each a, or the like.

The logistics base cloud 13 transmits a data acquisition request to the logistics data center 11, for example, periodically (S104). In response to the request from the logistics base cloud 13, the logistics data center 11 transmits cargo handling information related to the base to the logistics base cloud 13 (S105). Then, based on the cargo handling information received from the logistics data center 11, the logistics base cloud 13 updates an estimated time of entry of the vehicle 3 into the premises of the logistics base, for example, periodically (S106). In addition, the logistics base cloud 13 updates a logistics plan in the logistics base, for example, periodically (S107). Although will be described in detail below (see FIGS. 8 to 10), the updating of the logistics plan includes pairing a vehicle number (a vehicle ID), a berth number, and a cargo, re-planning a cargo handling time, etc. The cargo handling information according to the embodiment is an example of premises information.

The cargo handling information can be optionally set by a business operator, an association of business operators, or the like. The cargo handling information may include various types of information such as, for example, identification information about the cargo handling information, a transportation request ID, a transportation item ID, a desired cargo pickup start date and time, a desired cargo pickup end date and time, a desired cargo arrival start date and time, a desired cargo arrival end date and time, whether there is a berth reservation, a berth reservation number, a berth reservation time, incidental work information (inspection, horizontal/vertical holding, shelving, whether there is label attaching work, and details thereof), an expected incidental work time, a logistics base ID, and a vehicle ID.

Note that the cargo handling information is, for example, information transmitted from a consignee to a transportation business operator, but is not limited thereto. For example, the cargo handling information may be shared through the logistics data center 11, or may be shared through a logistics service providing company (an intermediary). In addition, the cargo handling information is not limited to that determined by the consignee, may be determined in real time by a logistics base operator (the warehouse side) in accordance with the situation in the logistics base 601. In this case, the logistics base operator (the warehouse side) may notify the transportation business operator or the vehicle 3 or the mobile terminal 4 thereof.

When the logistics plan in the logistics base is updated, the logistics base cloud 13 transmits cargo handling information including information on a berth number and a berth reservation time to the vehicle management cloud 12. Then, the vehicle management cloud 12 updates cargo handling information using the cargo handling information received from the logistics base cloud 13 (S108). In addition, the vehicle management cloud 12 transmits the updated cargo handling information to the vehicle 3 and/or the mobile terminal 4 (S109). Then, the vehicle 3 and/or the mobile terminal 4 updates the information related to the vehicle 3 (S110). In this manner, the vehicle 3 and/or the mobile terminal 4 transmits a vehicle ID (vehicle information) for identifying the vehicle 3 to the logistics base cloud 13, and acquires cargo handling information corresponding to the vehicle ID from the logistics base cloud 13.

At this time, the vehicle 3 and/or the mobile terminal 4 may display cargo handling information, namely, scheduled cargo handling information, at that time point, on the display screen 710 in the off-premises mode. Note that the content displayed as the scheduled cargo handling information is not a display based on confirmation information received from the logistics base 601, and thus may be changed when newly updated cargo handling information is received, or when final confirmation information is received from the logistics base 601 at the time of arrival at the logistics base 601 or the vicinity of the logistics base 601.

In one example, the display screen 710 in the off-premises mode may include an indication 718 of an estimated time of arrival at a predetermined stop position (cargo handling position) in the logistics base 601, which is a destination. The predetermined stop position in the logistics base 601, which is the destination, may be a position where the vehicle 3 is temporarily stopped for stand-by, evacuation, waiting for its turn, or the like in the logistics base 601, or may be a position where the vehicle 3 is stopped for cargo handling. The predetermined stop position is a cargo handling position at which the vehicle 3 is required to stop for cargo handling, and is at least one of a cargo unloading position at which the vehicle 3 is required to stop for unloading a cargo and a cargo loading position at which the vehicle 3 is required to stop for loading a cargo. Note that, in the present disclosure, the stop may include parking regardless of the time or the state that the vehicle 3 is stopped.

In one example, the display screen 710 in the off-premises mode may include an indication 719 of scheduled cargo handling information. In the example of FIG. 5, the indication 719 of the scheduled cargo handling information includes a display of a schedule of a predetermined stop position (a cargo handling position) in the logistics base 601, which is a destination, such as a berth number indicating a berth 613 such as "berth #2". In addition, the indication 719 of the scheduled cargo handling information includes an indication of scheduled task information indicating a schedule of incidental work (a cargo handling-related business task) to be performed after the driver P stops at the cargo handling position on the premises of the logistics base 601, which is a destination, such as "inspection and shelving". In addition, the indication 719 of the scheduled cargo handling information includes an indication of schedule information indicating a schedule of a time, such as "departing at 17:47", at which the cargo handling in the logistics base 601 should be completed for departure. The schedule information may be included in the cargo handling information as some of the task information.

Next, processing (S111 to S116) during a period from a time point when the vehicle 3 approaches the logistics base 601, which is a destination, or a time point when the vehicle 3 arrives at the logistics base 601 until the vehicle 3 departs from the logistics base 601, namely, when the vehicle 3 is located in the vicinity of or on the premises of the logistics base 601, will be described.

The logistics base cloud 13 checks or confirms the time at which the vehicle 3 enters the premises of the logistics base 601, for example, in the same manner as the processing of S104 to S108, or based on the latest cargo handling information that has already been acquired (S111). In addition, based on the checked or confirmed time of entry to the premises, the logistics base cloud 13 finally confirms cargo handling information including a berth number and a berth reservation time in accordance with the logistics plan in the logistics base (S112), for example, in the same manner as the processing of S107, and notifies the vehicle management cloud 12 of the finally confirmed cargo handling information (S113). Then, the vehicle management cloud 12 updates cargo handling information to be managed using the finally confirmed cargo handling information received from the logistics base cloud 13, and notifies the vehicle 3 and/or the mobile terminal 4 of the finally confirmed cargo handling information (S114). The vehicle 3 and/or the mobile terminal 4 updates information related to the vehicle 3. In this manner, after the vehicle 3 starts traveling on the public road 603 toward the logistics base 601 and until the vehicle 3 reaches the predetermined range from the logistics base 601, the vehicle 3 and/or the mobile terminal 4 acquires, from the logistics base cloud 13 of the logistics base 601, cargo handling information including a cargo handling position (a berth 613) at which the vehicle 3 is required to stop for handling a cargo on the premises of the logistics base 601.

Note that the logistics base cloud 13 may directly notify the vehicle 3 and/or the mobile terminal 4 of the cargo handling information without going through the vehicle management cloud 12 in the updating of the cargo handling information (step S108) and the notifying of the finally confirmed cargo handling information (S113).

The description will continue with a case where it is determined that the vehicle 3 has entered the premises of the logistics base 601 or has approached the logistics base 601 within a predetermined distance. Note that the entry of the vehicle 3 into the premises or the approach of the vehicle 3 within the predetermined distance may be detected by a GNSS sensor in the vehicle 3 and/or the mobile terminal 4, or may be detected through wireless communication between the vehicle 3 and/or the mobile terminal 4 and the entrance 605. Alternatively, the entry of the vehicle 3 into the premises or the approach of the vehicle 3 within the predetermined distance may be detected by specifying a vehicle number or the like through image recognition using a camera provided at the entrance 605 and inquiring the database of the logistics base cloud 13.

After the vehicle 3 and/or the mobile terminal 4 are notified of the finally confirmed cargo handling information, and when detection is made such that the vehicle 3 has entered the premises of the logistics base 601 or that the vehicle 3 has approached the logistics base 601 within the predetermined distance, the vehicle 3 and/or the mobile terminal 4 switches the vehicle control including the screen display to the on-premises mode (S115). The HMI 33 of the vehicle 3 or the HMI 43 of the mobile terminal 4 displays a screen in the on-premises mode in which a map inside the logistics base 601 is shown, for example, an on-premises mode in which information regarding route guidance in the specific area is presented on the basis of the finally confirmed cargo handling information (S116).

Thereafter, when the exit of the vehicle 3 from the premises of the logistics base 601 is detected, the vehicle 3 and/or the mobile terminal 4 switches the vehicle control including the screen display to the off-premises mode (S117).

In one example, when notified by the logistics base cloud 13 that the cargo handling has been completed, the vehicle 3 and/or the mobile terminal 4 detects the exit of the vehicle 3 from the premises of the logistics base 601. In one example, when the vehicle 3 is determined to be located near the exit 606 or off the premises based on the position information obtained using the GNSS sensor, the exit of the vehicle 3 from the premises of the logistics base 601 is detected. In one example, the vehicle 3 and/or the mobile terminal 4 detects the exit of the vehicle 3 from the premises of the logistics base 601 on the basis of a result of specifying a vehicle ID based on wireless communication with the exit 606 and an image of the camera provided at the exit 606.

When the exit of the vehicle 3 from the premises of the logistics base 601 is detected, the vehicle 3 and/or the mobile terminal 4 switches the guidance information to be displayed by transitioning from the display screen 720 in the on-premises mode for displaying second guidance information to the display screen 710 in the off-premises mode for displaying first guidance information. In one example, when automatic driving is executed by the on-premises mode, the vehicle 3 and/or the mobile terminal 4 switches the driving mode from an automatic driving mode to a manual driving mode.

FIG. 6 illustrates a display screen 720 displayed on the HMI 33 of the vehicle 3 or the HMI 43 of the mobile terminal 4 in the on-premises mode. The display screen 720 includes an indication 721 of a base map (a premises map). Note that the display screen 720 may include some of the indication 711 of the road map and the indication 712 of the first route on the public road. The premises map is based on, for example, a virtual traffic object existing in a cyberspace, which is acquired from the logistics base cloud 13. In other words, the premises map is based on map information related to a virtual traffic infrastructure drawn in the cyberspace (the virtual space), namely, a traffic infrastructure that does not exist in the real space. Thus, the second guidance information presented on the display screen 720 in the on-premises mode indicates information regarding the virtual traffic object on the premises map. In addition, the display screen 720 includes at least two of an indication 713 of a current position of the vehicle 3, an indication of a berth 613 as a stop position, and an indication of a second route 609 related to a traveling path 612 (each second-type traveling path) on the non-public road from the current position to the stop position. In addition, the display screen 720 includes an indication 718 of an estimated time of arrival at the stop position in the logistics base 601.

The second route 609 is a route related to the traveling path 612 on the premises for guiding the vehicle 3 having entered the premises of the logistics base 601 from the entrance 605 until the vehicle 3 stops at a designated stop position (for example, the berth 613). FIG. 3 illustrates a second route 609*a* for the vehicle 3*a* that has entered the premises of the logistics base 601 from the entrance 605*a* to move forward, stop at a stop line 611*a* numbered "3", move backward, and then enter a berth 613*a* numbered "3", which is displayed on the electronic signboards 607*a* and 615*a*, and the like. In addition, FIG. 3 illustrates a second route 609*b* for the vehicle 3*b* that has entered the premises of the logistics base 601 from the entrance 605*b* to move forward, stop at a stop line 611*b* numbered "11", move backward, and then enter a berth 613*b* numbered "11", which is displayed on the electronic signboards 607*b* and 615*b*, and the like.

In this manner, the display screen 720 in the on-premises mode presents, to the user, second guidance information indicating the second route 609 related to the traveling path 612 on the premises on the premises map. In other words, when the vehicle 3 reaches the predetermined range from the logistics base 601, the vehicle 3 and/or the mobile terminal 4 switches the guidance information displayed on the HMI 33 of the vehicle 3 or the HMI 43 of the mobile terminal 4 from the first guidance information to the second guidance information. Thus, the vehicle 3 and/or the mobile terminal 4 is configured to switch map data referred to on the premises or off the premises between the road map and the premises map. According to this configuration, the driver P can safely drive on the premises without straying even in an unfamiliar logistics base 601, and the traffic in the logistics base 601 can be made efficient based on the latest cargo handling information.

The number of the berth 613 to enter to be presented to the vehicle 3 may be displayed on the HMI 33 of the vehicle 3 or the HMI 43 of the mobile terminal 4, not limited to the electronic signboards 607 and 615. The information indicating the berth 613 to enter is not limited to the number of the berth 613 as long as it is information capable of specifying the berth 613 to enter, and may be displayed, for example, in such a manner as to emphasize a border or a position of the berth as illustrated in FIG. 6. The second route 609 to pass may be displayed as an indication of information indicating the berth 613 to enter.

The stop position of the vehicle 3, such as the berth 613, in the logistics base 601 may change with a logistics situation in the logistics base 601. Therefore, the vehicle 3 and/or the mobile terminal 4 are configured to acquire the latest or final confirmed information from a computer outside the vehicle 3 such as the logistics base cloud 13. In addition, the vehicle 3 and/or the mobile terminal 4 is configured to automatically switch and display information indicating the second route 609 from the current location of the vehicle 3 to the berth 613 to park on the premises, information indicating the stop position such as the berth 613, in accordance with the acquired information. The vehicle 3 and/or the mobile terminal 4 is configured to display second guidance information including a second route 609 related to a stop position of the vehicle 3 at that time point as needed on the premises of the logistics base 601, differently from the way that the information is displayed off the premises.

The indication of the second route 609 on the premises may be a display including a stop line 611, or may be a simple display such as a display of a line that simply connects the entrance 605 and the berth 613 as a stop position to each other.

In addition, information (task information) regarding incidental work to be performed after the driver P parks at the destination (the berth 613 to park) on the premises may be displayed as an image on the display screen 720 in the on-premises mode, or may be notified by sound. The second guidance information presented on the display screen 720 in the on-premises mode includes task information indicating a business task that is work to be performed by the driver P on the premises, which is acquired from the logistics base cloud 13 together with the cargo handling information.

The incidental work is a cargo handling-related business task to be performed by the driver P, and includes a task related to at least one of unloading the cargo from the vehicle 3, loading the cargo onto the vehicle 3, sorting the cargo, packing the cargo, and administrative processing related to transportation and shipment of the cargo.

In one example, the incidental work may be inspection work for checking the quality and quantity of cargos. In one example, the incidental work may be horizontal/vertical holding determination work for determining whether to lift cargos horizontally or vertically at the time of loading the cargos depending on the shape or weight of the cargo. In one example, the incidental work may be shelving work for efficiently carrying cargos at the time of loading the cargos onto the vehicle 3, or for carrying cargos to a predetermined position in the logistics base at the time of unloading the cargos from a truck. In one example, the incidental work may be label attaching work for attaching labels indicating places to which cargos are to be delivered.

Alternatively, the information regarding the incidental work may be information indicating whether there is work regarding at least one of these kinds of work. In addition, the information regarding the incidental work may include information indicating an estimated time required for the incidental work and information indicating a scheduled departure time.

FIG. 6 illustrates an indication 725 of information regarding incidental work. The indication 725 includes information indicating that the destination on the premises is a berth 613 whose berth number is "3". In addition, the indication 725 includes information indicating that the incidental work during the cargo handling is inspection and shelving. In addition, the indication 725 includes information indicating that the scheduled departure time after finishing the cargo handling is 17:47.

In this manner, the driver P can easily check the finally confirmed incidental work at the time of arrival through the display screen 720 in the on-premises mode, so that only the necessary incidental work can be performed without waste, thereby efficiently performing cargo handling work and shortening the time.

As described above, the display screen 710 in the off-premises mode displays first guidance information indicating a first route of the public road 603 on a road map of a real space, namely, a road map related to a real traffic structure, in the same manner as in the standard car navigation. On the other hand, the display screen 720 in the on-premises mode displays second guidance information indicating a second route of a traveling path 612 on the premises map provided from the logistics base cloud 13. These maps may be configured to be divided into static data that does not change with time such as the traveling path 612 or buildings, and dynamic data that changes with time such as the vehicle 3 or the cargo handling information, like a dynamic map.

The logistics base cloud 13 may transmit not only the cargo handling information but also the premises dynamic map of the logistics base 601 to the vehicle 3 to support the automatic driving and the manual driving of the vehicle 3. For example, in the processing of S116, the control unit 31 of the vehicle 3 may switch the driving mode of the vehicle 3 from the manual driving mode, in which the vehicle 3 is moved in accordance with a driving operation of the driver P, to the automatic driving mode, in which the vehicle 3 is moved on the basis of the finally confirmed cargo handling information. In this case, only when receiving a dynamic map including dynamic data from the logistics base cloud 13, the vehicle 3 may switch the driving mode to travel on the premises by automatic driving.

When, for example, the vehicle 3 enters the premises of the logistics base 601, the vehicle 3 and/or the mobile terminal 4 switches the map to be displayed to the dynamic map received from the logistics base cloud 13. At the same time, the control unit 31 of the vehicle 3 may switch the driving mode of the vehicle 3 from the manual driving mode to the automatic driving mode to travel by automatic driving to a stop position (the berth 613), which is the final destination, and to align with the stopping direction at the stop position.

In this case, the vehicle 3 and/or the mobile terminal 4 may display an image display or output a sound, through the HMI 33 and/or the HMI 43 to indicate that the vehicle 3 is traveling in the automatic driving mode according to the premises dynamic map.

The display screen 720 in FIG. 6 includes an indication 722 of an identification object for identifying whether the map data being referred to is for on-premises or off-premises. The identification object is information indicating which of first guidance information and second guidance information is currently displayed on the HMI 33 and/or the HMI 43. On the display screen 720 in FIG. 6, it is exemplified that "base map" is displayed in the on-premises mode using the premises map as the indication 722 of the identification object.

In one example, the display screen 720 in FIG. 6 includes an indication 722 of an identification object for identifying a current driving mode. The identification object is information indicating which of manual driving and automatic driving is currently set as the driving mode of the vehicle 3. On the display screen 720 in FIG. 6, it is exemplified that "automatic driving" is displayed in the on-premises mode using the premises map as the indication 722 of the identification object. In this case, the second route 609 indicates a scheduled route for automatic driving. In addition, the vehicle 3 and/or the mobile terminal 4 may output, by sound, message information 729 indicating that the vehicle 3 is traveling in the driving mode switched to automatic driving in accordance with the premises dynamic map, such as "The vehicle switched to the automatic driving. The vehicle will move to berth #3". Note that an indication manner of the second route 609 may be different between during automatic driving and during manual driving. For example, by changing the color, the pattern, or the like of the line, the driver P can easily visually recognize the mode in which the vehicle 3 is traveling.

The display screen 720 in FIG. 6 may include an indication 727 of an operation button for switching the driving mode on the premises between automatic driving mode and manual driving mode. FIG. 6 illustrates a button marked "switch to manual driving" as the indication 727 of the operation button displayed when the driving mode on the premises is set to the automatic driving mode. Even after the driving mode on the premises is set to the automatic driving mode, the vehicle 3 and/or the mobile terminal 4 may switch to the manual driving mode automatically if the indication 727 of the operation button is pressed, the driver P operates any one of the brake, the accelerator, and the steering wheel, or a time delay or an error is confirmed in the dynamic map sent from the logistics base cloud 13. In addition, for example, when the driving mode is automatically switched to the manual driving mode, the vehicle 3 and/or the mobile terminal 4 may display the fact on a screen or output a sound message. In addition, the indication 727 of the operation button may be displayed in the manual driving mode on the premises, or may be displayed on the display screen 710 in the off-premises mode.

In this manner, by displaying the standard off-premises road map and the information for identifying the automatic driving mode according to the real-time in-premises dynamic map, the driver P can easily and clearly grasp whether the current guidance information is in on-premises mode or in the off-premises mode. In addition, the driver P can easily and clearly grasp whether the current traveling is manual driving such as level 2 or lower or automatic driving such as level 3 or higher.

Note that, it is not limited to the switch between off-premises map and the premises map. In one example, by using a shared map, the map whose scale is larger than a predetermined scale value may be treated as the off-premises map, and the map whose scale is smaller than the predetermined scale value may be treated as the premises map. The scale may be automatically switched in accordance with the size of the premises that is a destination, a relay spot, or a departure place.

Figure 7:
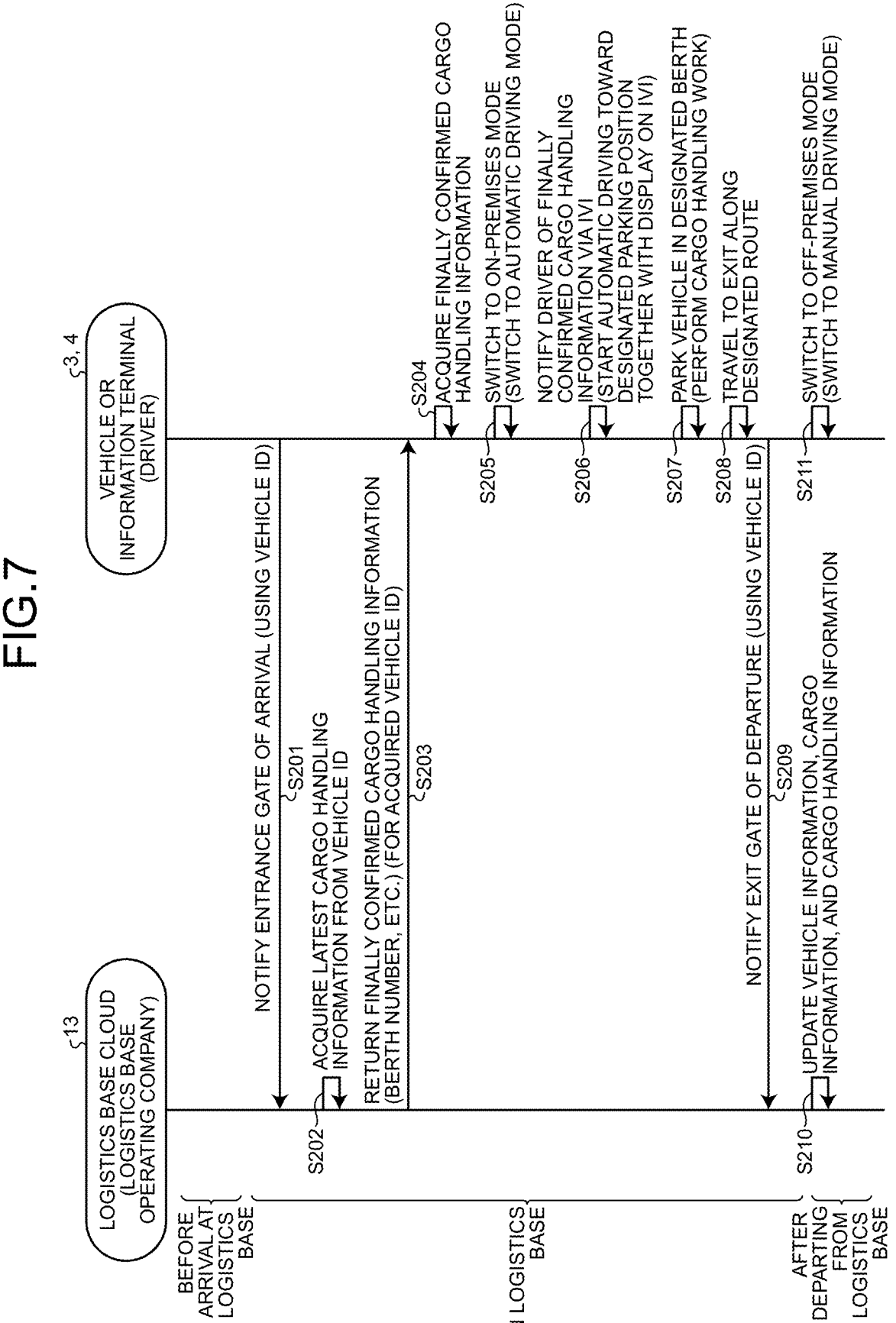
FIG. 7 is a sequence diagram illustrating another example of an information processing procedure executed by an information presentation system according to an embodiment.

Note that the above-described information processing may be implemented by transmission and reception of information between the logistics base cloud 13 and the vehicle 3 and/or the mobile terminal 4. FIG. 7 is a sequence diagram illustrating another example of an information processing procedure executed by an information presentation system 1 according to the embodiment. Differences from the information processing illustrated in FIG. 4 will be mainly described, and redundant description will be appropriately omitted.

The procedure of FIG. 7 is started in a state where the first guidance information (the display screen 710) is presented in the off-premises mode in which information regarding route guidance is presented outside the specific area. When the vehicle 3 arrives at the entrance 605 of the logistics base 601, the vehicle 3 and/or the mobile terminal 4 notifies the logistics base cloud 13 of the arrival by, for example, communicating with the entrance 605 (S201).

In one example, the vehicle 3 and/or the mobile terminal 4 transmit a notification including a vehicle ID to the entrance 605 of the logistics base 601. Note that the notification of the arrival is not limited to that performed by communication of the logistics base cloud 13 with the entrance 605, and a vehicle number may be identified from an image captured by a camera provided at the entrance 605, and the logistics base cloud 13 may detect that a corresponding vehicle 3 has arrived, or the vehicle 3 and/or the mobile terminal 4 (an application program operating thereon) may transmit information on a current position of the vehicle 3 or a fact that the vehicle 3 has arrived at a predetermined site of the logistics base to the logistics base cloud 13 to notify the arrival. Note that the information included in the notification or the information specified in the logistics base cloud 13 is not limited to the vehicle ID, and may be any information capable of uniquely specifying the vehicle 3 entering the premises.

The logistics base cloud 13 acquires the latest cargo handling information associated with the vehicle ID in the same manner as in the processing of S111 to S113 in FIG. 4 (S202), and returns the acquired cargo handling information such as a finally determined berth number for the vehicle ID to the vehicle 3 (S203).

The vehicle 3 and/or the mobile terminal 4 acquires the finally confirmed cargo handling information from the logistics base cloud 13 in the same manner as in the processing of S114 and S115 in FIG. 4 (S204), and switches the vehicle control, including the screen display, to the on-premises mode (S205). At this time, the HMI 33 of the vehicle 3 or the HMI 43 of the mobile terminal 4 displays the display screen 720 in the on-premises mode in the same manner as in the processing of S116 in FIG. 4 (S206).

As described above, the vehicle 3 and/or the mobile terminal 4 may switch the driving mode to the automatic driving mode when the vehicle control is switched to the on-premises mode.

Note that the timing of switching to the on-premises mode is not limited thereto. In the procedure in FIG. 7 as well, similarly to the procedure in FIG. 4, the vehicle 3 may switch from the off-premises mode to the on-premises mode during the period from when the vehicle 3 approaches a predetermined distance from the logistics base 601 to when the vehicle 3 passes through the gate of the entrance 605. In addition, the processing of switching to automatic driving may be executed after the vehicle 3 stops at a predetermined space on the premises.

Thereafter, as described above with reference to FIG. 4, after the vehicle 3 travels along a second route to a predetermined stop position such as a designated berth 613, and stops at the predetermined stop position (the cargo handling position), cargo handling work (incidental work) is performed by the driver P or the like (S207). In addition, as described above with reference to FIG. 4, after the cargo handling work is completed, the vehicle 3 travels to the exit 606 along the designated second route (S208), and transmits, for example, a notification including the vehicle ID to the exit 606 of the logistics base 601 (S209).

Thereafter, the logistics base cloud 13 updates the vehicle information, the cargo information, and the cargo handling information (S210). The logistics base cloud 13 updates the data of the cargo handling information to be managed, assuming that the vehicle 3 with the notified vehicle ID has loaded (or unloaded) a cargo having a transportation item ID in the logistics base 601, and has departed the logistics base 601 at a time when the vehicle 3 passed through a gate of the exit 606 (S210).

The cargo information can be optionally set by a business operator, an association of business operators, or the like. The cargo information may include various types of information such as information for identifying the cargo information, a transportation request ID, a desired cargo pickup start date and time, a desired cargo pickup end date and time, a cargo pickup place, cargo pickup incidental work information, a desired cargo arrival start date and time, a desired cargo arrival end date and time, a cargo arrival place, cargo arrival incidental work information (similar to that at the cargo pickup time), a transportation item ID, cargo packing information (a code for identifying cardboard, pallet, bag, box, can, tray, envelope, or the like), a transportation packaging weight, a transportation packaging volume, a mixed loading condition (a requirement as to whether mixed loading is available, whether there is a danger/odor, or temperature-humidity vibration), a consignor ID, a consignor address, a consignor phone number, a consignee ID, a consignee address, a consignee phone number, freight charge information (a desired or upper limit freight charge to be paid by a consignor based on each of cargo pickup date and time, cargo arrival date and time, and transportation method ($CO_2$ emission)), and a freight charge billing destination code. The cargo pickup incidental work information is information indicating details of incidental work that the driver is required to perform at the cargo pickup time, and such work may be putting a signature on a paper material, making a scan or a signature on a terminal, or the like.

The data of the cargo handling information may be managed by the logistics data center 11, in the same manner as in the procedure in FIG. 4.

In addition, when the exit of the vehicle 3 from the premises of the logistics base 601 is detected, the vehicle 3 and/or the mobile terminal 4 switches the vehicle control including the screen display to the off-premises mode (S211).

Note that the timing of switching to the off-premises mode is not limited thereto. In the procedure in FIG. 7 as well, similarly to the procedure in FIG. 4, the vehicle 3 may switch from the on-premises mode to the off-premises mode during the period from when the vehicle 3 stops for cargo handling at a place (e.g., the berth 613) to when the vehicle 3 arrives at the gate of the exit 606. In addition, the processing of switching from automatic driving to manual driving may be executed after the vehicle 3 stops at a predetermined space on the premises. In this manner, detailed navigation dedicated to the premises of the logistics base may be directly performed between the logistics base cloud 13 and the vehicle 3 and/or the mobile terminal 4. This makes it possible to notify the driver P (or the vehicle 3 that performs automatic driving) of the latest detailed route and the parking/stopping position in an easy-to-understand and accurate manner.

Figure 9:
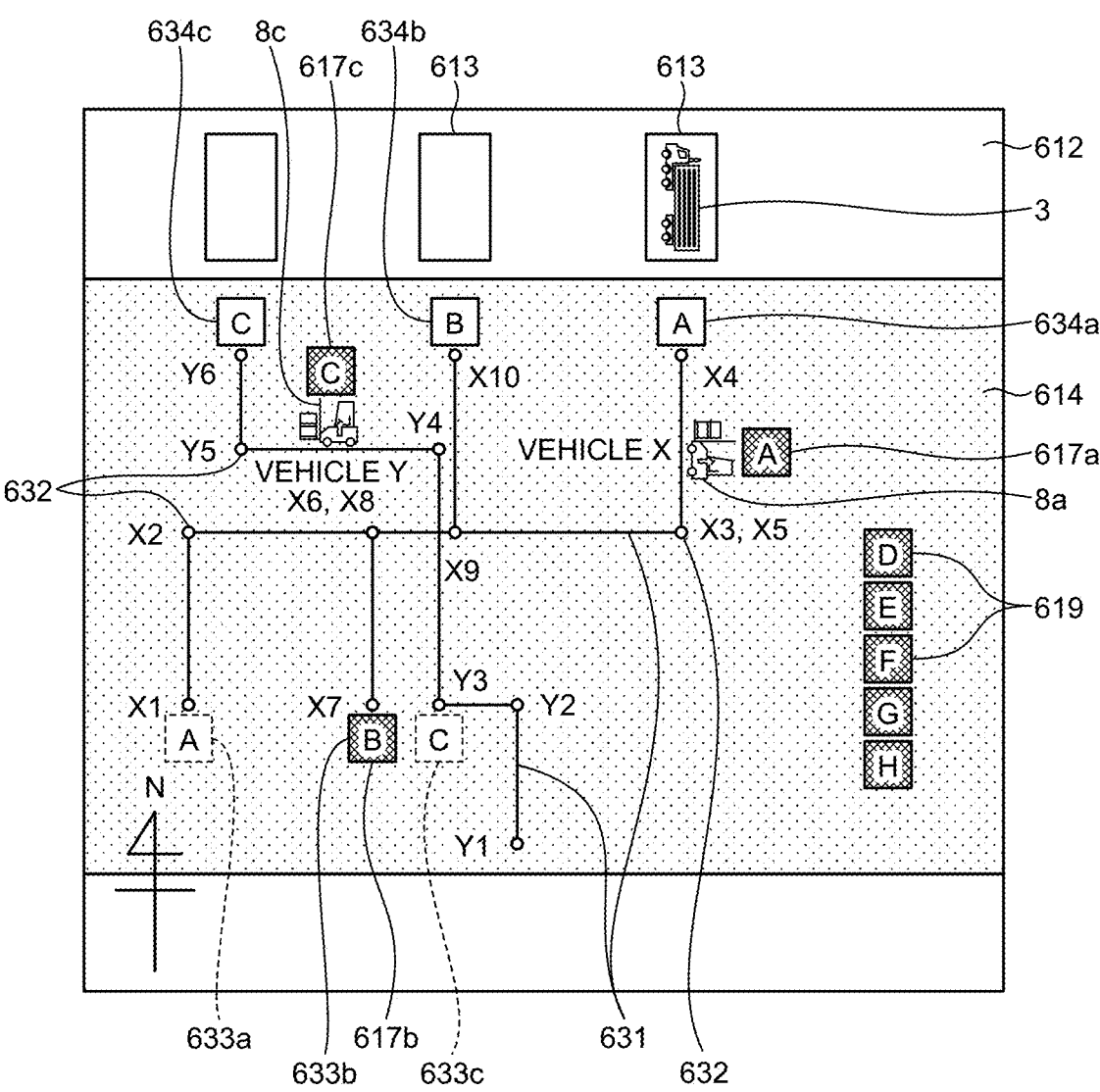
FIG. 9 is a diagram for describing construction of a traffic infrastructure in a virtual space regarding a specific area according to an embodiment.

The dynamic map of the premises of the logistics base 601 generated by the logistics base cloud 13 will be described. FIGS. 8 and 9 are diagrams for describing the construction of the traffic infrastructure in the cyberspace (the virtual space) for a specific area according to the embodiment.

The logistics base cloud 13 can update and manage information on facilities, cargos, and vehicles 3 and 8 in the logistics base 601, and instruct safe and efficient operation plans to the vehicles 3 and 8 operated by automatic driving or manned driving in the base.

In the cargo handling space 614 of the logistics base 601, various vehicles 8 such as forklifts are operated in accordance with their operation plans. FIG. 8 illustrates an operation plan 810 of a vehicle 8c operated in the cargo handling space 614 of the logistics base 601. The operation plan 810 includes, for example, information on a coordinate position information of the vehicle 8c, a task (cargo handling work) to be performed at the position, a scheduled time at which the vehicle 8c arrives at the position, and a difference of a current time (in a case where the current time is 10:53:10) from the scheduled time. The operation plan 810 is, for example, information that can be displayed in a table format. The operation plan 810 is transmitted to the vehicle 8c, and is used for supporting the driving operation of the control unit 31 that controls the automatic driving of the vehicle 8c or the manned driver.

FIG. 9 illustrates coordinates on a dynamic map according to an operation plan in a case where two vehicles 8a and 8c simultaneously transport cargos 617 marked "A" to "C" in a shared manner in the cargo handling space 614. In the example of FIG. 9, each of the squares "A" to "H" indicates an individual cargo 617 moved in the cargo handling space 614 or an individual cargo 619 placed in the cargo handling space 614. The cargo 617a marked "A" is a cargo moved by the vehicle 8a along a traveling path 631 from a position 633a of a coordinate position "X1" to a position 634a of a coordinate position "X4". The cargo 617b marked "B" is a cargo scheduled to be moved by the vehicle 8a along the traveling path 631 from a position 633b of a coordinate position "X7" to a position 634b of a coordinate position "X10" after the cargo 617a marked "A". The cargo 617c marked "C" is a cargo moved by the vehicle 8c along the traveling path 631 from a position 633c of a coordinate position "Y3" to a position 634c of a coordinate position "Y6". The cargos 619 marked "D" to "H" are cargos for which the operation plan is not yet determined at the current time point or cargos for which there is time until transportation according to the operation plan. The coordinate positions "Xn (n is 1 to 10)" represent event positions 632 according to the operation plan of the vehicle 8a in the virtual space representing the logistics base 601 in chronological order. Similarly, the coordinate positions "Yn (n is 1 to 6)" represent event positions 632 such as a departure (movement start) position, an arrival position, a passing position, a cargo handling (loading or unloading) position, and a direction change (rotation) position according to the operation plan 810 of the vehicle 8c in the virtual space representing the logistics base 601 in chronological order.

In the present disclosure, the virtual traffic object may include one or more of coordinate positions "Xn" and "Yn", information on times of arrival/passage there, moving routes (virtual traveling paths 631 indicated by a coordinate position "Xn" to a coordinate position "Xn+1" and a coordinate position "Yn" to a coordinate position "Yn+1"), and task information there. Traffic objects indicating the traffic infrastructure on the premises, such as event positions of the vehicles 8 represented by the coordinate positions "Xn" and "Yn", traveling paths 631 connecting the event positions, and signs, are virtual traffic objects that are not arranged in the real space. Therefore, on the basis of position information acquired by position sensors such as GNSS sensors provided in the vehicles 8 such as forklifts and identification code information (code information such as QR codes (registered trademark) or barcodes or BLE beacon information) attached to cargos and read by the vehicles 8 such as forklifts, a current situation is generated as a digital twin by the logistics base cloud 13. Then, on the basis of the information indicating the states of the cargos and the vehicles 8 at the current time point, the logistics base cloud 13 prepares an efficient and safe operation plan, and supplies the operation plan to each vehicle 8. The vehicle 8 that has been supplied (instructed) with the operation plan is automatically or manually driven on the basis of the operation plan.

Note that the event positions 632 of the vehicles 8 represented by the coordinate positions "Xn" and "Yn" and the traveling paths 631 between these positions may or may not be indicated on a road surface (in a real space) in the site of the logistics base 601. In the logistics base 601, the traffic infrastructure (traffic objects), such as roads, signs, intersections, and traffic lights, is not arranged in the physical space. On the other hand, among the vehicles 8 moving in a space within the logistics base 601, routes illustrated in FIG. 9 or routes through which the respective vehicles 8 pass within a predetermined time from the current time are shared, for example, directly or indirectly via the logistics base cloud 13. The traffic objects arranged in the virtual space is used for vehicle control during automatic driving and driving operation by a manned driver.

The logistics base cloud 13 adjusts the operation plan for each vehicle 8 in such a manner that moving objects such as the vehicles 8 do not approach each other. Specifically, the logistics base cloud 13 creates an operation plan to enhance logistics efficiency, and at the same time, adjusts the times of passing through routes or points, the cargo transportation order, and the like in such a manner that moving objects such as the vehicles 8 are operated while being kept spaced apart from each other by a predetermined distance or more.

In the example of FIG. 9, there is a possibility that the vehicles 8a and 8c approach each other within a predetermined distance while the vehicle 8c travels in a section from a coordinate position "Y3" to a coordinate position "Y4" along the operation plan 810. Therefore, the logistics base cloud 13 creates an operation plan for the vehicle 8a in such a manner that the vehicle 8a is located, for example, in a section from a coordinate position "X3" to a coordinate position "X5", which is physically sufficiently spaced apart from the vehicle 8c when the vehicle 8c passes through the section from the coordinate position "Y3" to the coordinate position "Y4".

Note that virtual traffic objects constructed in the virtual space and having no physical presence in the real space, such as virtual traveling paths 631, event positions 632, signs, intersections, and traffic lights, may be displayed as illustrated in FIG. 9 on an information terminal such as an HMI of the input/output I/F 53 of the logistics base cloud 13, an IVI of the vehicle 8, a smartphone, a tablet, or a personal computer, or may be displayed in a superimposed manner on the real space via an HMD or an AR video. In addition, the vehicle 8 may project a traffic object such as a virtual traveling path on the cargo handling space 614 or the ground using projection mapping.

Although the vehicle 8 has been described above in one example, the present disclosure is not limited thereto, and may be applied to a moving object within a specific area including the vehicle 3. For example, the present disclosure can be applied in a case where vehicles transporting cargos simultaneously move in the same area such as an airport, a station, a freight train terminal, a loading port (an unloading port), or a factory, as well as a logistics base 601 or a logistics warehouse.

FIG. 10 is a diagram illustrating an example of a manner in which information regarding a specific area is presented according to the embodiment. A display screen 730 showing the status of each berth 613 is displayed on the IVI of the vehicle 8. Note that a similar display screen may be displayed as a screen for managing the logistics base 601 in the logistics base cloud 13. The display screen 730 includes the latest information generated by the logistics base cloud 13, such as an operation plan 820 for the host vehicle, whether the vehicle 3 has been entered the premises for each berth 613, an estimated arrival time when the vehicle 3 has not entered the premises, a vehicle ID of the vehicle 3, incidental cargo handling information, an estimated cargo handling completion time, and a berth number to which work should be prioritized. The vehicle 8 drives automatically or manually on the basis of the information received from the logistics base cloud 13 to efficiently place or handle cargos.

The display screen 730 includes a display of a dynamic map 731. On the dynamic map 731, a route (a traveling path) of the host vehicle and a route of another vehicle may be displayed to be visually distinguishable from each other. In one example, on the display screen 730, each route may be displayed to be visually distinguishable by changing a color or a form and/or a pattern of a line. The vehicles displayed on the display screen 730 are not limited to the vehicle 8 such as a forklift that travels only in the logistics base 601, and includes a vehicle 3 such as a truck that travels also outside the logistics base 601. Thus, the display screen 730 may be displayed with various vehicles entering the premises or located on the premises in an area indicated by the dynamic map 731.

On the display screen 730, the operation plan 820 may be displayed in an easily viewable manner by deleting the finished task as illustrated in FIG. 10, or may be entirely displayed in an easy-to-understand manner as illustrated in FIG. 8.

FIG. 10 illustrates a display screen 730 on the IVI of the vehicle 8a. The dynamic map 731 of the display screen 730 includes an indication of the vehicle 3 having already entered the berth 613 and an indication of the vehicle 8 moving in the cargo handling space 614. A travel route 732 for the vehicle 8a is displayed on the dynamic map 731. This travel route 732 is, for example, a route to a position that will be reached at a predetermined time ahead from a current position of the host vehicle. In the example of FIG. 10, the travel route 732 represents a route up to a predetermined time ahead in a case where the vehicle 8a transports a cargo 617a marked "A" along a route from the coordinate position "X3" to the coordinate position "X4", unloads the cargo 617a at the coordinate position "X4", and then travels along a route from the coordinate position "X4" through the coordinate positions "X5" and "X6" to the coordinate position "X7" to load a cargo 617b marked "B" at a position 633b represented by the coordinate position "X7".

Note that the coordinate position "X8" and subsequent event positions may be displayed, although not displayed because they are event positions a certain time or more ahead from the current time.

Note that a route from the coordinate position "X7" to the coordinate position "X8" after the cargo 617b marked "B" is loaded at the position 633b represented by the coordinate position "X7" is a route that reversely follows the route from the coordinate position "X6" to the coordinate position "X7", and thus visibility may deteriorate due to overlap of their indications. Therefore, overlapping routes may be displayed in an offset manner, or routes may be displayed only up to routes that do not overlap.

Note that, on the display screen 730, regarding the route for the host vehicle, the color or the display pattern of the line may be changed based on the time margin and the recommended moving speed on the route. As a result, the display screen 730, in which the way to display the route for the host vehicle is different from that for the other vehicles or only the route up to a predetermined time ahead is displayed, makes it possible to display an operation plan for the near future in an easy-to-see and easy-to-understand manner, so that the driver of the vehicle 8 or the administrator of the logistics base 601 can check the latest schedule (plan) at a glance.

Note that, on the display screen 730 for the site manager of the logistics base 601, a spot where a trouble occurs, such as a route with a time delay, may be indicated by a red line or the like to be displayed to be distinguishable from the other spots. In addition, a cargo for which its handling time has already arrived may be displayed to be visually distinguishable from the other cargos in an easily viewable manner, for example, by enclosing or painting the cargo in red. Similarly, a berth 613 at which it is almost time that a vehicle arrives and a vehicle 3 for which the departure time has passed may be displayed to be distinguishable from the other berths 613 and the other vehicles 3.

In addition, the display screen 730 includes indications of persons P1 and P2 in the cargo handling space 614. The persons P1 and P2 are displayed in a superimposed manner on the premises map after being detected by a method such as analyzing camera images obtained by cameras provided in the logistics base 601 such as the cargo handling space 614, detecting positions using short-range wireless communication such as BLE beacon, or reading data from GNSS circuit-mounted devices worn by the persons P1 and P2. In this manner, by arranging the persons P1 and P2 on the map in real time, it is possible to create an operation plan in such a manner that a route of each vehicle 8 is spaced apart from the persons by a certain distance or more, thereby enhancing safety in the base and realizing a work site with few accidents. In addition, for the persons P1 and P2 who engage in work in this section (the cargo handling space 614), since information on their positions is reflected in real time, so that they know that the vehicle 8 will not approach them within a certain distance, and they can work with peace of mind.

As described above, the information presentation system 1 according to the embodiment, is capable of, when moving objects such as the vehicles 3 and 8 come and go in a certain wide site, flexibly determining an optimal operation plan at that time based on virtual traffic objects, rather than installing physical traffic objects indicating a traffic infrastructure such as fixed roads and traffic control functions (lanes, traffic lights, etc.), depending on a current situation, such as positions and states of the cargos 617 and 619 in the logistics base 601, positions and states of the forklifts (the vehicles 8) and the trucks (the vehicles 3), and the availability of the berth 613, and transmitting the operation plan to each vehicle. Movement and cargo handling can be performed in accordance with the operation plan determined based on virtual traffic objects, thereby improving efficiency of logistics. In addition, the state can be displayed on the screen or projected to the real world so that the site manager can easily grasp the state.

In addition, in the information presentation system 1 according to the embodiment, a status/information notification facility such as the electronic signboards 607 and 615 in the logistics base 601 is also controlled by the logistics base cloud 13, and its status and operation state can be changed in real time. As a result, it is possible to share the situation at that time in real time and appropriately between the drivers of the vehicles 3 and 8 such as trucks or other workers engaged in cargo handling work in the logistics base 601. Therefore, in the information presentation system 1 according to the embodiment, it is possible to improve work efficiency and safety in the logistics base 601.

In the information presentation system 1 according to the present disclosure, a virtual traffic infrastructure such as a virtual road, a virtual speed sign, a virtual intersection, a virtual stop position, a virtual traffic light, and a virtual crosswalk can be developed on a dynamic map, and the dynamic map can be shared between vehicles entering the map (specific area). As a result, similarly to a case where there is a traffic infrastructure provided in a real space such as a real road or traffic signal, a plurality of vehicles can be enabled to safely and efficiently drive on a traveling path of a non-public road in the area. In this manner, in the information presentation system 1 according to the present disclosure, by constructing a virtual traffic infrastructure such as a virtual intersection or a virtual traffic light when a vehicle enters a specific area managed with a dynamic map from a general road (public road) outside the specific area, it is possible to use position information (e.g., a vehicle ID and a vehicle position detected by a camera) from sensors outside the vehicle, rather than relying only on in-vehicle sensors in the vehicle that has switched to automatic driving, thereby enhancing safety of automatic driving.

Note that the information presentation system 1 according to the above-described embodiment may be configured to assist a vehicle in traveling safely by using a real-time dynamic map collected by sensors provided in a traffic infrastructure, rather than relying only on in-vehicle sensors, in order to safely pass between a public road and a sidewalk and between the sidewalk and the premises and on the premises. Meanwhile, when a vehicle that is traveling by automatic driving or manual driving detects a dangerous situation such as a collision by an in-vehicle sensor provided in the vehicle itself, the vehicle may autonomously avoid the dangerous situation so as to perform safe driving even if the dynamic map does not indicate the dangerous situation (namely, in preference to driving assistance using the dynamic map), or may notify the driver of the detected dangerous situation.

Note that, in the information presentation system 1 according to the above-described embodiment, route guidance in the off-premises mode based on first guidance information at a point spaced apart from the logistics base 601, namely, outside the specific area, is performed on the basis of, for example, map information about a traffic infrastructure that is not easy to change, which is managed by a car navigation system provided in the vehicle 3 and installed in a real space such as a road. On the other hand, route guidance in the on-premises mode based on second guidance information in the specific area is performed on the basis of map information about a virtual traffic infrastructure (traffic object) that is constructed in a cyberspace and does not exist in a real space. The route guidance in the on-premises mode also involves displaying the virtual traffic infrastructure that does not exist in the physical space (real space) so that a person in the real space can see the virtual traffic infrastructure as well. In other words, car navigation information referred to off the premises is based on a traffic infrastructure in the real world, and car navigation information referred to on the premises is based on a traffic infrastructure in the virtual world or a combination of the traffic infrastructure in the real world and the traffic infrastructure in the virtual world. The presentation of the car navigation information is switched by the control unit 31 when the position of the vehicle or the passage through the gate of the vehicle is detected.

In the route guidance in the off-premises mode based on the map information about the real space, statistical information such as traffic congestion information can be displayed, but operation routes of individual other vehicles and the like are neither detected nor displayed. In contrast, the route guidance in the on-premises mode based on the map information about the cyberspace according to the present disclosure is greatly different in that position information and operation plan information (the most recent routes and the like) for not only the host vehicle but also one or more other vehicles in the dynamic map can be displayed.

In addition, the map information about the real space referred to in the route guidance in the off-premises mode does not change over time for a long period of time. On the other hand, the map information about the cyberspace referred to in the route guidance in the on-premises mode and the operation plan therein may change from moment to moment, and the display and application can be updated in accordance with the change. This is because information on vehicles, cargos, etc. in a specific target area is collected in real time in the logistics base cloud 13, and an optimal operation plan can be instructed to each vehicle to ensure safety and high logistics efficiency in the logistics base 601. In a real space, a vehicle cannot travel in a place where there is no road. On the other hand, in a specific target area for a dynamic map in the logistics base 601, a virtual traveling path (road) can be freely set as long as the vehicle can pass through the area, and a specific vehicle can travel along the set virtual traveling path. Therefore, it is possible to improve the efficiency of the operation in the area, such as planning a movement along the shortest route in accordance with a situation, rather than installing a traffic infrastructure such as a physically fixed road.

In addition, in a specific area where there is no traffic infrastructure in the real space, when a vehicle is manually driven, the driver cannot directly see traffic infrastructure such as roads, intersections, or traffic lights. Under such circumstances, in route guidance in the specific area in the on-premises mode, the information presentation system 1 according to the present disclosure can display a route determined based on a virtual traffic infrastructure on the IVI screen of the vehicle or can guide the route by voice. At this time, the second guidance information such as the virtual traffic infrastructure, the map information, and the traveling route of the host vehicle can be displayed in a superimposed manner in front of the driver's field of view using a method such as a HUD, an HMD, or projection mapping.

Note that, although it has been described in the above-described embodiment that the information presentation system 1 is applied to the logistics base 601, but the application of the information presentation system 1 is not limited thereto. The information presentation system 1 according to the present disclosure can be appropriately applied to, for example, a space in which there is a certain large site, such as an airport, a harbor, a civil engineering work site, a mining site, a building site, a construction site, logistics in a factory, and a tourist site, and a traffic infrastructure is different from that of a public road, and a real road or traffic light is not provided. When such a space in the specific area is made into a dynamic map, it is possible to perform operation management and work management with reference to the dynamic map for any vehicle traveling in the specific area by automatic driving or manned driving.

A case where the information presentation system 1 according to the present disclosure is applied to a passenger business operator will be described. For example, a driver who drives a high-speed bus (vehicle) requiring seat reservation may need to check how many passengers get on or off the bus at each stop, and which seats are occupied by the passengers who have gotten on the bus. In such a case, when the control unit 31 detects that the vehicle has stopped at the stop, the information presentation system 1 according to the present disclosure can display information (task information) for incidental work in business to be performed by the driver when the vehicle has stopped at the stop, such as checking the number of passengers getting on or off the vehicle or checking the positions of the seats of the passengers who have gotten on the vehicle, on the IVI of the vehicle 3 or the mobile terminal 4 of the driver, thereby facilitating the driver's confirmation work. Moreover, the information presentation system 1 according to the present disclosure can present information indicating whether a passenger has checked in baggage and a position where the baggage is stored to the passenger who has gotten off the bus, and notify the driver of the information, so that the passenger who has checked in baggage does not forget the baggage in the vehicle.

A case where the information presentation system 1 according to the present disclosure is applied to a civil engineering business operator will be described. For example, for civil engineering work, a destination and an arrival time for each vehicle may be specified in detail on the basis of an operation plan or a work plan of a dedicated heavy machine (a vehicle), an operation plan of each truck (vehicle), and the like, and work (task) details for each vehicle are specified, such as where, when, and how much each vehicle loads civil engineering materials. However, in general, at a civil engineering site, there is no partitioned land such as the logistics base 601, making it difficult to improve work efficiency. Under such circumstances, the information presentation system 1 according to the present disclosure can individually determine operation plans for each of the vehicles entering and exiting the site according to the progress of civil engineering work so as to make work between these vehicles safe and efficient, and instruct the operation plan (work plan) for each vehicle based on the determined individual operation plan. Specifically, the information presentation system 1 according to the present disclosure can manage an operation and instruct an operation for each vehicle at the work site, similarly to the logistics base 601, based on map information about a virtual traffic infrastructure. Therefore, the information presentation system 1 according to the present disclosure is capable of smoothly operating work of each vehicle even at the civil engineering work site, which changes every day including the shape of the land. Thus, the information presentation system 1 according to the present disclosure is capable of enabling each worker such as a driver to easily check second guidance information, such as when, at which position, and in which direction a truck (vehicle) carrying in or out civil engineering materials should stop, and what the incidental work is at the stop position. As a result, the work at the civil engineering work site can be efficiently carried out.

In each of the above-described embodiments, the vehicle 3 is, for example, an automobile such as a truck, but is not limited thereto. As the vehicle 3 according to the present disclosure, for example, various kinds of vehicles such as a wheelchair, a bicycle, an electric kickboard, an automobile, a motorcycle, and a railway vehicle can be appropriately used. In addition, the vehicle 3 may be driven in any means. The vehicle 3 may be an electric vehicle driven by using a battery mounted thereon, a vehicle driven using an internal combustion engine, or a vehicle driven by human power.

Note that, in each of the above-described embodiments, "determining whether it is A" may mean determining that it is A, determining that it is not A, or determining whether it is A or not.

Each program executed by each device of the information presentation system according to each of the above-described embodiments may be recorded on a computer-readable storage medium, such as a CD-ROM, an FD, a CD-R, a DVD, or an SD card, as a file in an installable format or an executable format for provision.

In addition, each program executed by each device of the information presentation system according to each of the above-described embodiments may be stored on a computer connected to a network such as the Internet and downloaded via the network for provision. In addition, each program executed by each device of the information presentation system according to each of the above-described embodiments may be provided or distributed via a network such as the Internet.

In addition, each program executed by each device of the information presentation system according to each of the above-described embodiments may be installed in a ROM or the like in advance for provision.

In addition, the program executed by each device of the information presentation system according to each of the above-described embodiments has a module configuration including each functional unit of each device, and as actual hardware, the processor 51 such as a CPU reads the program from the memory 52 such as a ROM and an HDD and executes the program, so that each functional unit is loaded on the RAM of the memory 52, and each functional unit is generated on the RAM of the memory 52.

According to at least one of the above-described embodiments, information suitable for the purpose of use of the vehicle can be presented to the user. In one example, according to at least one of the above-described embodiments, it is possible to appropriately set different information presentation modes regarding route guidance inside and outside a specific area with different traffic infrastructures.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

(Supplementary Note)

The following technology is disclosed by the above description of the embodiments.

(Supplementary Note 1)

An information presentation method in an information presentation device for presenting information to a user in a vehicle interior of a vehicle, the method including:

displaying first guidance information on a display provided in the vehicle interior, the first guidance information indicating, on a road map, at least part of a first route related to a first-type traveling path from a current position of the vehicle to a destination of the vehicle; and switching the first guidance information displayed on the display to second guidance information when the vehicle reaches a predetermined range from the destination, wherein the second guidance information indicates, on a premises map of the destination, at least part of a second route related to a second-type traveling path on premises of the destination connected to the first-type traveling path up to a predetermined stop position set on the premises of the destination.

(Supplementary Note 2)

The information presentation method according to the supplementary note 1, further including:

in the information presentation device configured to be communicable with a server, acquiring premises information including the predetermined stop position from the server, after the vehicle starts traveling on the first-type traveling path toward the destination and before the vehicle reaches the predetermined range from the destination.

(Supplementary Note 3)

The information presentation method according to the supplementary note 1 or 2, further including:

in the information presentation device configured to be communicable with a server, acquiring premises information including the predetermined stop position from the server, after the vehicle reaches the predetermined range from the destination and before the vehicle switches the guidance information.

(Supplementary Note 4)

The information presentation method according to the supplementary note 2 or 3, wherein the acquiring of the premises information includes:

transmitting a vehicle ID for identifying the vehicle to the server; and acquiring the premises information corresponding to the vehicle ID from the server.

(Supplementary Note 5)

The information presentation method according to the supplementary note 2 or 3, wherein the second guidance information includes task information indicating a business task that is work the user needs to perform on the premises, and the task information is acquired from the server together with the premises information.

(Supplementary Note 6)

The information presentation method according to the supplementary note 5, wherein the destination is a logistics base for logistics in which a cargo is transported by the vehicle for transporting the cargo, the predetermined stop position is a cargo handling position at which the vehicle is required to stop for handling the cargo on the premises of the logistics base, the premises information is cargo handling information including the cargo handling position, and the business task is a task related to at least one of unloading the cargo from the vehicle, loading the cargo onto the vehicle, sorting one or more cargos including the cargo, packing the cargo, and administrative processing related to transportation and shipment of the cargo.

(Supplementary Note 7)

The information presentation method according to any one of the supplementary notes 1 to 6, further including additionally displaying an identification object on the display, the identification object indicating whether guidance information currently displayed on the display is the first guidance information or the second guidance information.

(Supplementary Note 8)

The information presentation method according to any one of the supplementary notes 1 to 7, further including:

in the information presentation device provided in the vehicle in which a first sensor that is at least one of a camera, a positioning sensor, and a LiDAR and a second sensor that is at least one of a radar, a magnetic sensor, and a short-range wireless communication circuit are disposed, when the vehicle is traveling outside the predetermined range, detecting a current position of the vehicle via the first sensor; and when the vehicle is traveling on the premises of the destination, detecting the current position of the vehicle via at least the second sensor among the first sensor and the second sensor.

(Supplementary Note 9)

The information presentation method according to the supplementary note 8, further including:

in the information presentation device configured to be communicable with a server, when the vehicle is traveling outside the predetermined range, detecting a real traffic object existing in a physical space via the first sensor, and performing driving assistance or automatic driving with respect to the vehicle based on the real traffic object, and when the vehicle is traveling on the premises of the destination, identifying a virtual traffic object existing in a cyberspace via the server, and performing the driving assistance or the automatic driving based on at least the virtual traffic object among the real traffic object and the virtual traffic object, in which the second guidance information indicates information related to the virtual traffic object on the premises map.

(Supplementary Note 10)

A computer program instructing a computer as an information presentation device for presenting information to a user in a vehicle interior of a vehicle to execute processing, the processing including:

displaying first guidance information on a display provided in the vehicle interior, the first guidance information indicating, on a road map, at least part of a first route related to a first-type traveling path from a current position of the vehicle to a destination of the vehicle; and switching the first guidance information displayed on the display to second guidance information when the vehicle reaches a predetermined range from the destination, wherein the second guidance information indicates, on a premises map of the destination, at least part of a second route related to a second-type traveling path on premises of the destination connected to the first-type traveling path up to a predetermined stop position set on the premises of the destination.

(Supplementary Note 11)

A computer program instructing a computer to execute the information presentation method according to any one of the supplementary notes 1 to 9.

(Supplementary Note 12)

A storage medium on which the computer program according to the supplementary note 10 or 11 is recorded as a computer program to be executed by a computer.

(Supplementary Note 13)

An information presentation device for presenting information to a user in a vehicle interior of a vehicle, the information presentation device including:

at least one processor; and a memory storing a program for causing the at least one processor to execute a predetermined procedure, in which, based on the program, the at least one processor is configured to:

display first guidance information on a display provided in the vehicle interior, the first guidance information indicating, on a road map, at least part of a first route related to a first-type traveling path from a current position of the vehicle to a destination of the vehicle; and switch the first guidance information displayed on the display to second guidance information when the vehicle reaches a predetermined range from the destination, wherein the second guidance information indicates, on a premises map of the destination, at least part of a second route related to a second-type traveling path on premises of the destination connected to the first-type traveling path up to a predetermined stop position set on the premises of the destination.

What is claimed is:

1. An information presentation method of presenting information to a user in a vehicle interior of a vehicle for transporting a cargo, the information presentation method comprising:

displaying first guidance information indicating, on a road map, at least part of a first route from a current position of the vehicle to a destination of the vehicle, the displaying being performed on a display provided in the vehicle interior; and switching the first guidance information displayed on the display to second guidance information when the vehicle reaches a predetermined range from the destination, the second guidance information indicating, on a premises map of the destination, at least part of a second route to a stop position at which the vehicle is required to stop for handling the cargo on premises of the destination.

2. The information presentation method according to claim 1, further comprising acquiring cargo handling information including the stop position from a server, the acquiring being performed after the vehicle starts traveling toward the destination and before the vehicle reaches the predetermined range from the destination.

3. The information presentation method according to claim 1, further comprising acquiring cargo handling information including the stop position from a server, the acquiring being performed after the vehicle reaches the predetermined range from the destination and before the vehicle switches to the second guidance information.

4. The information presentation method according to claim 2, wherein the acquiring of the cargo handling information includes:

transmitting, to the server, a vehicle ID for identifying the vehicle; and acquiring, from the server, the cargo handling information corresponding to the vehicle ID.

5. The information presentation method according to claim 3, wherein the acquiring of the cargo handling information includes:

transmitting, to the server, a vehicle ID for identifying the vehicle; and acquiring, from the server, the cargo handling information corresponding to the vehicle ID.

6. The information presentation method according to claim 2, wherein the second guidance information includes task information indicating a business task required to be performed on the premises by the user, and the task information is acquired from the server together with the cargo handling information.

7. The information presentation method according to claim 3, wherein the second guidance information includes task information indicating a business task required to be performed on the premises by the user, and the task information is acquired from the server together with the cargo handling information.

8. The information presentation method according to claim 6, wherein the destination is a logistics base for transporting the cargo by the vehicle, and the business task is a task related to at least one of unloading the cargo from the vehicle, loading the cargo onto the vehicle, sorting one or more cargos including the cargo, packing the cargo, and administrative processing related to transportation and shipment of the cargo.

9. The information presentation method according to claim 7, wherein the destination is a logistics base for transporting the cargo by the vehicle, and the business task is a task related to at least one of unloading the cargo from the vehicle, loading the cargo onto the vehicle, sorting one or more cargos including the cargo, packing the cargo, and administrative processing related to transportation and shipment of the cargo.

10. The information presentation method according to claim 1, further comprising additionally displaying, on the display, an identification object indicating which of the first guidance information and the second guidance information is currently displayed on the display.

11. The information presentation method according to claim 1, wherein the vehicle includes a first sensor and a second sensor, the first sensor being provided with at least one of a camera, a positioning sensor, and a LiDAR, the second sensor being provided with at least one of a radar, a magnetic sensor, and a short-range wireless communication circuit, and the information presentation method further comprises:

detecting a current position of the vehicle via the first sensor when the vehicle is traveling outside the predetermined range; and detecting a current position of the vehicle via the second sensor or via the first sensor and the second sensor when the vehicle is traveling on the premises of the destination.

12. The information presentation method according to claim 11, further comprising:

when the vehicle is traveling outside the predetermined range, detecting a real traffic object existing in a physical space via the first sensor, and performing driving assistance or automatic driving with respect to the vehicle based on the real traffic object; and, when the vehicle is traveling on the premises of the destination, identifying a virtual traffic object existing in a cyber-space via the server, and performing the driving assistance or the automatic driving based on the virtual traffic object or based on the real traffic object and the virtual traffic object, wherein the second guidance information indicates information related to the virtual traffic object on the premises map.

13. A non-transitory computer-readable recording medium on which programmed instructions are recorded, the instructions causing a computer to execute processing, the computer serving to present information to a user in a vehicle interior of a vehicle for transporting a cargo, the processing to be executed by the computer comprising:

displaying first guidance information indicating, on a road map, at least part of a first route from a current position of the vehicle to a destination of the vehicle, the displaying being performed on a display provided in the vehicle interior; and switching the first guidance information displayed on the display to second guidance information when the vehicle reaches a predetermined range from the destination, the second guidance information indicating, on a premises map of the destination, at least part of a second route to a stop position at which the vehicle is required to stop for handling the cargo on premises of the destination.

14. An information presentation device presenting information to a user in a vehicle interior of a vehicle for transporting a cargo, the information presentation device comprising:

a hardware processor; and a memory in which a computer program for causing the hardware processor to execute predetermined processing is stored, wherein the hardware processor is configured to, based on the computer program, display first guidance information indicating, on a road map, at least part of a first route from a current position of the vehicle to a destination of the vehicle, the first guidance information being displayed on a display provided in the vehicle interior, and switch the first guidance information displayed on the display to second guidance information when the vehicle reaches a predetermined range from the destination, the second guidance information indicating, on a premises map of the destination, at least part of a second route to a stop position at which the vehicle is required to stop for handling the cargo on premises of the destination.

* * * * *